United States Patent
Tandon et al.

(10) Patent No.: US 10,496,642 B2
(45) Date of Patent: Dec. 3, 2019

(54) QUERYING INPUT DATA

(71) Applicant: THE REGENTS OF THE UNIVERSITY OF MICHIGAN, Ann Arbor, MI (US)

(72) Inventors: Prateek Tandon, Ann Arbor, MI (US); Thomas Friedrich Wenisch, Ann Arbor, MI (US); Michael John Cafarella, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 922 days.

(21) Appl. No.: 14/862,350

(22) Filed: Sep. 23, 2015

(65) Prior Publication Data

US 2016/0098450 A1   Apr. 7, 2016

Related U.S. Application Data

(63) Continuation-in-part of application No. 14/494,047, filed on Oct. 3, 2014, now abandoned.

(51) Int. Cl.
*G06F 16/20* (2019.01)
*G06F 16/2453* (2019.01)
*G06F 16/2455* (2019.01)

(52) U.S. Cl.
CPC .... *G06F 16/24542* (2019.01); *G06F 16/2455* (2019.01)

(58) Field of Classification Search
CPC . G06F 17/3046; G06F 17/30477; G06F 17/30
See application file for complete search history.

(56) References Cited

U.S. PATENT DOCUMENTS

| | | | |
|---|---|---|---|
| 6,751,772 B1 | 6/2004 | Kim | |
| 7,539,032 B2* | 5/2009 | Ichiriu | G06F 16/90344 365/49.17 |
| 7,539,681 B2* | 5/2009 | Norton | G06F 17/30985 |
| 2008/0033974 A1 | 2/2008 | Cameron | |
| 2008/0049865 A1 | 2/2008 | Blankenship | |
| 2012/0262314 A1 | 10/2012 | Carlson | |
| 2016/0012107 A1* | 1/2016 | Asaad | G06F 17/30442 707/764 |

OTHER PUBLICATIONS

U.S. Appl. No. 14/494,047, filed Oct. 3, 2014; Inventor: Tandon et al.

(Continued)

*Primary Examiner* — Kristopher Andersen
(74) *Attorney, Agent, or Firm* — Nixon & Vanderhye P.C.

(57) ABSTRACT

A hardware accelerator 2 for performing queries into, for example, an indexed text log files is formed of plurality of hardware execution units (text engines) 4, each executing a partial query program upon the same full set of input data. These partial query programs may switch between different query algorithms on up to a per-character basis. The sequence of data when loaded into a buffer memory 16 for querying may be searched for delimiters as the data is loaded. The hardware execution units may support a number match program instruction which serves to identify a numeric variable, and to determine a value of that numeric variable located at a variable position within a sequence of characters being queried.

3 Claims, 13 Drawing Sheets

(56) References Cited

OTHER PUBLICATIONS

U.S. Appl. No. 15/160,247, filed May 20, 2016; Inventor: Cafarella et al.
M. Busch et al, "Earlybird: Real-Time Search at Twitter" Proceedings of the 2012 28th International Conference on Data Engineering ICDE '12, Apr. 1, 2012, 10 pages.
Doshi, "Using File Contents as Input for Search, Blogs: Tips & Tricks" http://blogs.splunk.com/2009/08/28/using-file-contents-as-input-for-search/ Aug. 28, 2009, 3 pages.
N. Hua et al, "Variable-Stride Multi-Pattern Matching for Scalable Deep Packet Inspection" IEEE INFOCOM 2009, Apr. 19-25, 2009, pp. 415-423.
IBM Corp., IBM PureData System for Analytics Architecture: A Platform for High Performance Data Warehousing and Analytics, 2010, pp. 1-16.
O. Kocberber et al, "Meet the Walkers, Accelerating Index Traversals for In-Memory Databases" MICRO-46 Dec. 7-11, 2013, pp. 468-479.
A. Lamb et al, "The Vertica Analytic Database: C-Store 7 Years Later" Proceedings of the VLDB Endowment, vol. 5, No. 12, Aug. 27-31, 2012, pp. 1790-1801.
S. Manegold, "Database Architecture Evolution: Mammals Flourished long before Dinosaurs became Extinct" VLDB '09, Aug. 24-29, 2009, 6 pages.
S. Melnik et al, "Dremel: Interactive Analysis of Web-Scale Datasets" Proceedings of the VLDB Endowment, vol. 3, No. 1, Sep. 13-17, 2010, 10 pages.
R. Mueller, "Data Processing on FPGAs" VLDB '09, Aug. 24-28, 2009, 12 pages.
L. Neumeyer, "S4: Distributed Stream Computing Platform" IEEE International Conference on Data Mining Workshops (ICDMW), Dec. 13, 2010, 8 pages.
R.L. Villars et al, "Big Data: What it is and Why You Should Care" IDC, White Paper, Jun. 2011, pp. 1-14.
V. Sikka et al, "SAP HANA: The Evolution from a Modern Main-Memory Data Platform to an Enterprise Application Platform" Proceedings of the VLDB Endowment, vol. 6, No. 11, Aug. 26-30, 2013, 2 pages.
M. Stonebraker et al, "The 8 Requirements of Real-Time Stream Processing" ACM SIGMOD, vol. 34, Issue 4, Dec. 2005, 6 pages.
VOLTDB, Technical Overview, High Performance, Scalable RDBMS for Big Data and Real-Time Analytics, 4 pages.
J. Teubner et al, "Skeleton Automata for FPGAs: Reconfiguring without Reconstructing" SIGMOD'12, May 20-24, 2012, 12 pages.
L. Wu et al, "Q100: The Architecture and Design of a Database Processing Unit" ASPLOS'14, Mar. 1-5, 2014, 14 pages.
M. Zaharia et al, "Resilient Distributed Datasets: A Fault-Tolerant Abstraction for In-Memory Cluster Computing" NSDI'12 Proceedings of the 9th USENIX Conference on Networked Systems Design and Implementation, Apr. 25, 2012, 14 pages.
X. Zha et al, "GPU-to-GPU and Host-to-Host Multipattern String Matching on a GPU" IEEE Transactions on Computers, vol. 62, No. 6, Jun. 2013, pp. 1156-1169.
C. Chen et al, "An Efficient Multicharacter Transition String-Matching Engine Based on the Aho-Corasick Algorithm" ACM Transactions on Architecture and Code Optimization, vol. 10, No. 4, Article 25, Dec. 2013, pp. 1-22.
D. Bryant, "Disrupting the Data Center to Create the Digital Services Economy" https://communities.intel.com/community/itpeernetwork/datastack/blog/2014/06/18/disrupting-the-data-center-to-create-the-digital-services-economy Jun. 2014, 2 pages.
E. Hatcher et al, "Lucene in Action" 2005, 457 pages.
L. Woods et al, "Complex Event Detection at Wire Speed with FPGAs" Proceedings of the VLDB Endowment, vol. 3, No. 1, Sep. 13-17, 2010, pp. 660-669.
M. Stonebraker et al, "The VoltDB Main Memory DBMS" Bulletin of the IEEE Computer Society Technical Committee on Data Engineering, Jun. 2013, pp. 21-27.
A.V. Aho and M.J. Corasick, "Efficient string matching: An aid to bibliographic search," Communications of the ACM, vol. 18, No. 6, pp. 333-340, 1975.
R.S. Boyer and J.S. Moore, "A fast string searching algorithm," Communications of the ACM, vol. 20, No. 10, pp. 762-772, Oct. 1977.
S. Wu and U. Manber", A fast algorithm for multi-pattern searching," Technical report TR-94-17, Department of Computer Science, University of Arizona, May 1994 11 pages.
Y. H. Cho and W. H. Mangione-Smith, "A pattern matching coprocessor for network security," in Proc. DAC '05, pp. 234-239, ACM, 2005.
L. Tan and T. Sherwood, "A high throughput string matching architecture for intrusion detection and prevention," in Proc. ISCA '05, pp. 112-122, IEEE, 2005.
B. Commentz-Walter, "A string matching algorithm fast on the average," Proc. of the 6th Colloquium, on Automata, Languages and Programming, pp. 118-132, Jul. 1979.
R.Sidhu and V.K.Prasanna, "Fast regular expression matching using FPGAs," Proc. IEEE FCCM, pp. 227-238, Apr. 2001.
M. Becchi and P. Crowley, "Efficient regular expression evaluation—theory to practice," in Proc. Architectures for Networking and Communications Systems, ANCS, 2008, pp. 50-59.
D. Luchaup, R. Smith, C. Estan, and S. Jha, RAID 2009, LNCS 5758, pp. 284-303, 2009.
D. Pao, W. Lin and B. Liu, A memory-efficient pipelined implementation of the Aho-Corasick string—matching algorithm, ACM Trans. on Archit. Code Optim., vol. 7, pp. 1-27, Sep. 2010.
W. Lin and B. Liu, Pipelined parallel AC-based approach for multi-string matching, IEEE ICPADS, pp. 665-672, Dec. 2008.
Y. Sugawara, M. Inaba and K. Hiraki, Over 10Gbps string matching mechanism for multi-stream packet scanning systems, Field Programmable Logic and Application, vol. 3203, pp. 484-493, 2004.
G. Tripp, A parallel string matching engine for use in high speed network intrusion detection systems, Journal in Computer Virology, vol. 2, pp. 21-34, Aug. 2006.
H. Lu, K. Zheng, B. Liu, X. Zhang, Y. Liu, A Memory-Efficient Parallel String Matching Architecture for High-Speed Intrusion Detection, IEEE Journal on Selected Areas in Communication, vol. 24, No. 10, Oct. 2006, p. 1793-1804.
Jan van Lunteren, Christoph Hagleitner, Kubilay Atasu, Giora Biran, Uzi Shvadron, and Timothy Heil, "Designing a Programmable Wire-Speed Regular-Expression Matching Accelerator", IEEE Computer Society, Dec. 2012, pp. 461-472.
A. Bremler-Barr, D. Hay and Y. Koral, "CompactDFA: Generic State Machine Compression for Scalable Pattern Matching", IEEE INFOCOM, 2010, 9 pages.
P. Piyachon and Y. Luo, "Compact State Machines for High Performance Pattern Matching", 28.5, 2007, pp. 493-496.
S. Borkar and A. A Chien, "The Future of Microprocessors", Communicaitons of the ACM, vol. 54, No. 5, May 2011, pp. 67-77.
H.Esmaeilzadeh, E. Blem, R, St Amant, K Sankaralingam and D Burger, "Dark Silicon and the End of Multicore Scaling in Computer Architecture", ISCA '11, Jun. 4-8, 2011, pp. 365-376.
J. Leverich and C. Kyzyrakis, "On the Energy (in)efficiency of Hadoop Clusters. SIGOPS Operating Systems Review" printed on Sep. 23, 2014, pp. 61-65.
A. Pavlo E Paulson, A. Rasin, D. J Abadi, D. J DeWitt, S Madden and M Stonebraker, "A comparison of approaches to large scale data analysis", IGMOD '09, Jun. 29-Jul. 2, 2009, pp. 165-178.
A. Raghavan. Y Luo. A Chandawalla, M Papaefthymiou, K. P Pipe, T Wenisch and M Martin Computation, Sprinting in high performance computer architecture, PCA 2012, 12 pages.
Synopsys Designware Building blocks, Designware Developers Guide, (Sep. 2011), 94 pages.
M Taylor, "Is dark silicon useful?", DAC 2012, (Jun. 3-7, 2012), 6 pages.
Office Action dated Sep. 7, 2018 in co-pending U.S. Appl. No. 15/160,247, 21 pages.

* cited by examiner

| Instruction | Description |
|---|---|
| *matchString* | Process input stream one character at a time, and attempt to match against a pattern matching state machine. Supports exact matches and regular expressions |
| *matchNumber* | Process input stream one character at a time, and convert the charcters seen into a number; equivalent to a hardware version of ATOI |
| *checkNumber* | Check if number seen by *matchNumber* is greater than, less than, or equal to specified value |
| *math* | Perform mathematical operations such as addition, subtraction, division, multiplication, and XOR |
| *writeToResultQueue* | Write out the specified registers to the result queue |

FIG. 3 www.pbs.org/nature.html; 72; 06:32:09; opera; linux; 131.24.0.7; 13,789,432; 3125
www.pbs.org/frontline.html; 41; 07:14:15; safari; osx; 187.98.32.1; 762,989,123; 7412
www.pbs.org/peg+cat.html; 156; 08:47:45; firefox; osx; 243.56.171.53; 432,404; 6780
www.pbs.org/dinosaur_train.html; 23; 11:11:11; ie; windows; 54.12.87.10; 55,764; 904
www.pbs.org/nova.html; 32; 16:56:21; safari; osx; 212.63.75.31; 314,573; 510

| Algorithm 1 | The multicharacter bit-split pattern matching automata compilation algorithm |
|---|---|

Input: Query K and architecture width W
Output: Bit split automata set M

```
 1: S = shared (sort(⋃ predicates(K)))
 2: S' = []
 3: for each s ∈ S do
 4:    for i = 1 to W do
 5:       S'.append(pad(s, i, W))
 6:    end for
 7: end for
 8:
 9: Automata set M = {}
10: for each s ∈ S' do
11:    for i = 0 to len(s) do
12:       for bit b ∈ s[i] do
13:          M[i MOD W].addNode(b)
14:       end for
15:    end for
16: end for
17:
18: for each m ∈ M do
19:    makeDFA(m)
20:    for each q ∈ M.states do
21:       makePMV(q)
22:    end for
23: end for
```

FIG. 9

(a) Single-Unit (b) Multi-Unit, 32GC/s

QUERYING INPUT DATA

This application is a continuation-in-part of U.S. application Ser. No. 14/494,047 filed Oct. 3, 2014, the entire content of which is hereby incorporated by reference.

BACKGROUND

Field

This disclosure relates to the field of data processing systems. More particularly, this disclosure relates to querying input data.

Background

It is known to provide hardware accelerators for certain processing tasks. One target domain for such accelerators is natural language processing (NLP). The explosive growth in electronic text, such as tweets, logs, news articles, and web documents, has generated interest in systems that can process these data quickly and efficiently. The conventional approach to analyse vast text collections—scale-out processing on large clusters with frameworks such as Hadoop—incurs high costs in energy and hardware. A hardware accelerator that can support ad-hoc queries on large datasets, would be useful.

The Aho-Corasick algorithm is one example algorithm for exact pattern matching. The performance of the algorithm is linear in the size of the input text. The algorithm makes use of a trie (prefix tree) to represent a state machine for the search terms being considered. FIG. 1 of the accompanying drawings shows an example Aho-Corasick pattern matching machine for the following search terms, added in order: 'he', 'she', 'his' and 'hers'. Pattern matching commences at the root of the trie (state or node 0), and state transitions are based on the current state and the input character observed. For example, if the current state is 0, and the character 'h' is observed, the next state is 1.

The algorithm utilizes the following information during pattern matching:

Outgoing edges to enable a transition to a next state based on the input character observed.

Failure edges to handle situations where even though a search term mismatches, the suffix of one search term may match the prefix of another. For example, in FIG. 1, failure in state 5 takes the pattern matching machine to state 2 and then state 8 if an 'r' is observed.

Patterns that end at the current node. For example, the output function of state 7 is the pattern 'his'.

Typically, to ensure constant run time performance, each node in the pattern matching machine stores an outgoing edge for all the characters in the alphabet being considered. Therefore, each node has branching factor of N, where N is the alphabet size. For example, for traditional ASCII, the branching factor is 128. However, storing all possible outgoing edges entails a high storage cost. A technique to reduce the required storage through bit-split state machines has been proposed by Tan and Sherwood (L. Tan and T. Sherwood. A High Throughput String Matching Architecture for Intrusion Detection and Prevention. In Computer Architecture, 2005. ISCA '05. Proceedings. 32nd International Symposium on, 2005). The authors propose the splitting of each byte state machine into n-bit state machines. Since the bit state machine only has two outgoing edges for each node, the storage requirement is reduced drastically. Each state in the bit state machine corresponds to one or more states in the byte state machine. If the intersection of all bit state machines maps to the same state in the byte state machine, a match has been found and is reported.

Since regular expression matching involves harder to encode state transitions, transition rules that offer greater degrees of flexibility may be used. Transition rules of the form <current state, input character, next state> can be used to represent state machine transitions for regular expression matching. Van Lunteren et al. (J. Lunteren, C. Hagleitner, T. Heil, G. Biran, U. Shvadron, and K. Atasu. Designing a programmable wire-speed regular-expression matching accelerator. In Microarchitecture (MICRO), 2012 45th Annual IEEE/ACM International Symposium on, 2012) use rules stored using the technique of balanced routing tables; this technique provides a fast hash lookup to determine next states. In contrast, Bremler-Barr and co-authors (A. Bremler-Barr, D. Hay, and Y. Koral. Compactdfa: Generic state machine compression for scalable pattern matching. In INFOCOM, 2010 Proceedings IEEE, 2010), encode states such that all transitions to a specific state can be represented by a single prefix that defines a set of current states. Therefore, the pattern-matching problem is effectively reduced to a longest-prefix matching problem.

SUMMARY

Viewed from one aspect this disclosure provides a method of processing data comprising the steps of:

receiving a query specifying a query operation to be performed upon a set of input data;

generating a plurality of partial query programs each corresponding to a portion of said query operation; and executing each of said plurality of partial query programs with all of said set of said input data as an input to each of said plurality of partial query programs.

Viewed from another aspect this disclosure provides a method of processing data comprising the steps of:

receiving a query specifying a query operation to be performed upon input data;

programming one or more hardware execution units to perform said query, wherein said step of programming programs said one or more hardware execution units to use selected ones of a plurality of different query algorithms to perform different portions of said query operation upon different portions of said input data.

Viewed from another aspect this disclosure provides apparatus for processing data comprising:

a memory to store a sequence of data to be queried:

delimiter identifying circuitry to identify data delimiters between portions of said sequence of data as said data is stored to said memory; and a delimiter store to store storage locations of said data delimiters within said memory.

Viewed from another aspect this disclosure provides apparatus for processing data comprising:

programmable processing hardware responsive to a number match program instruction to identify a numeric variable and to determine a value of said numeric variable located at a variable position within a sequence of characters.

Another aspect of the disclosure provides apparatus for processing data comprising:

a receiver to receive a query specifying a query operation to be performed upon a set of input data;

a program generator to generate a plurality of partial query programs each corresponding a portion of said query operation; and hardware execution circuitry to execute each of said plurality of partial query programs with all of said set of said input data as an input to each of said plurality of partial query programs.

Another aspect of the disclosure provides apparatus for processing data comprising:

a receiver to receive a query specifying a query operation to be performed upon input data;

one or more hardware execution units programmed to perform said query, wherein said one or more hardware execution units are programmed to use selected ones of a plurality of different query algorithms to perform different portions of said query operation upon different portions of said input data.

Another aspect of the disclosure provides a method of processing data comprising the steps of:

storing in a memory a sequence of data to be queried;

identifying data delimiters between portions of said sequence of data as said data is stored to said memory; and storing in a delimiter store storage locations of said data delimiters within said memory.

Another aspect of the disclosure provides a method of processing data comprising the steps of:

in response to a number match program instruction executed by programmable hardware, identifying a numeric variable and determining a value of said numeric variable located at a variable position within a sequence of characters.

The above, and other objects, features and advantages of this disclosure will be apparent from the following detailed description of illustrative embodiments which is to be read in connection with the accompanying drawings.

DRAWINGS

FIG. 3 illustrates example program instructions;

Figures 6, 7:
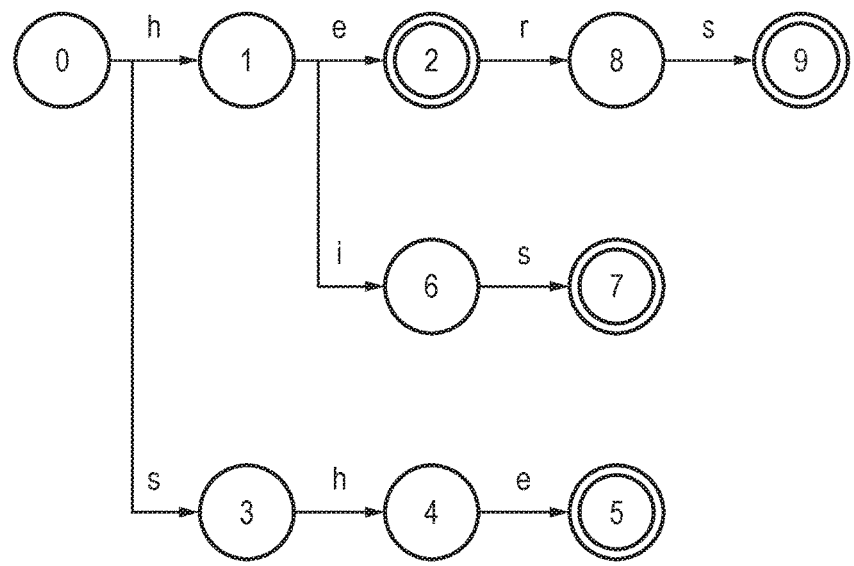
Figure 8:
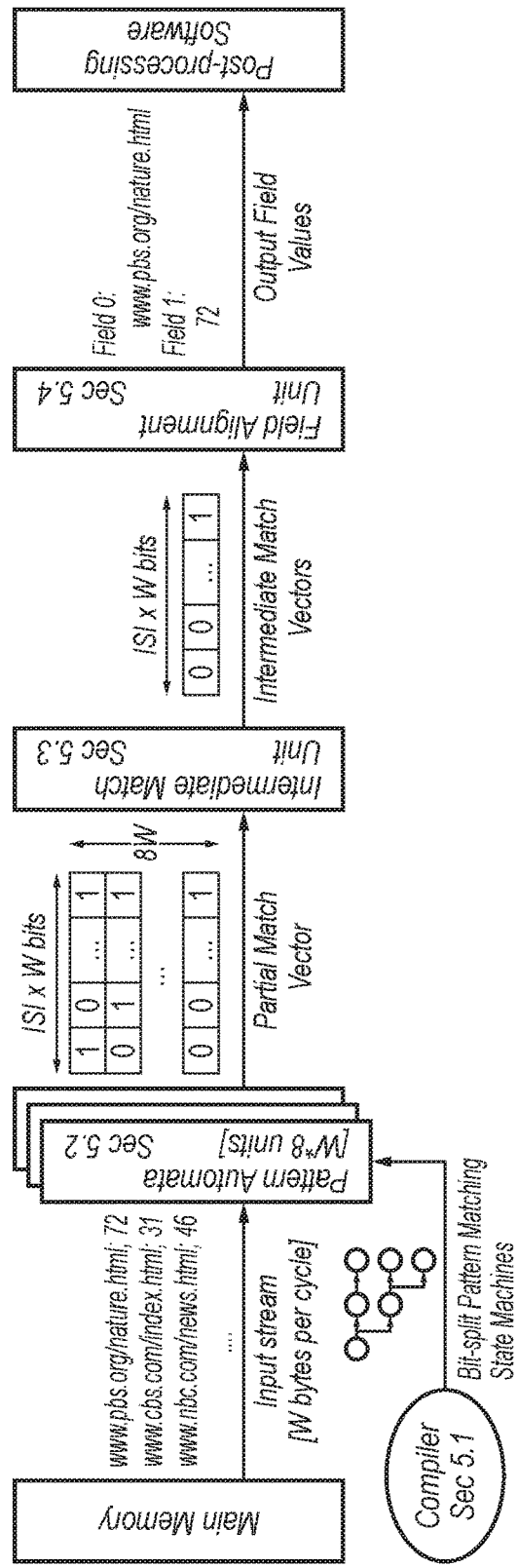
Figure 9:
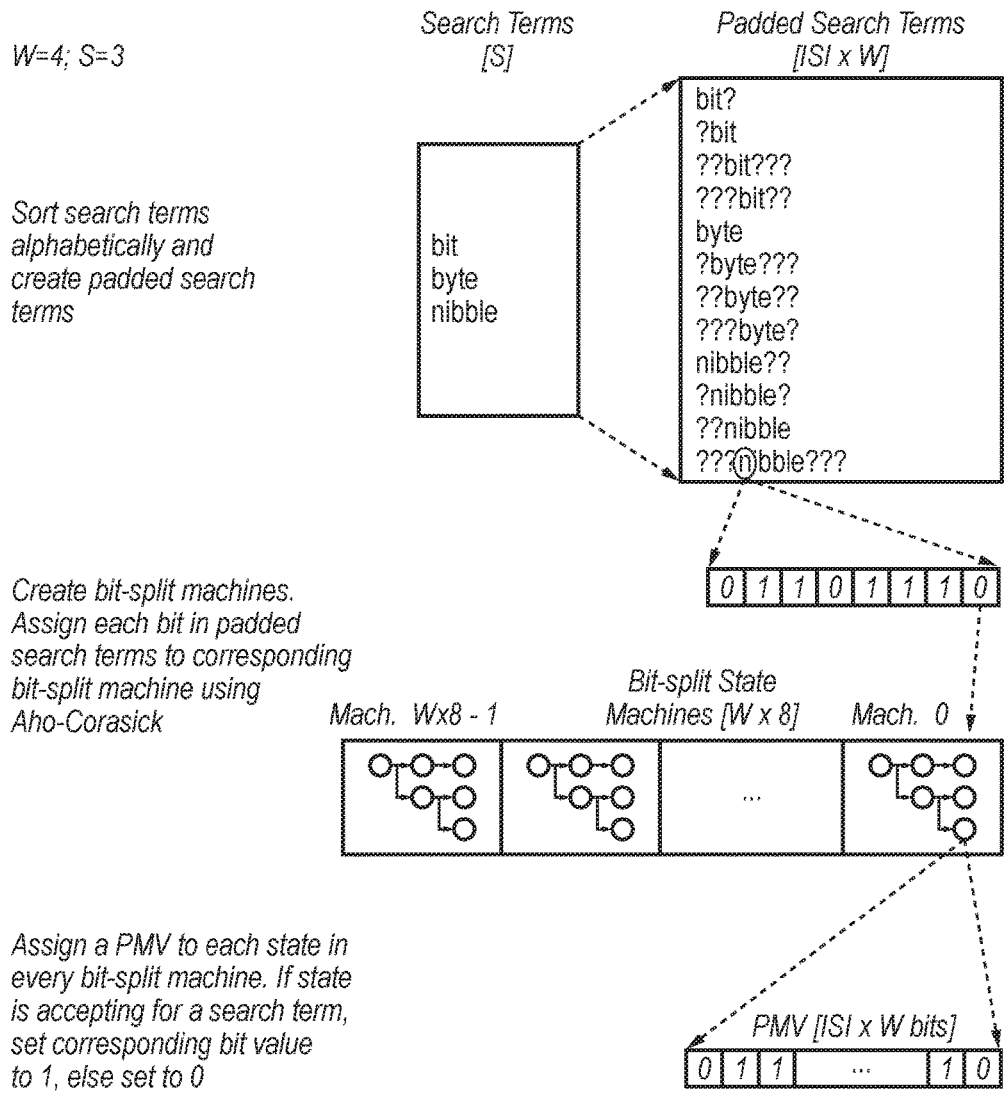
Figure 10:
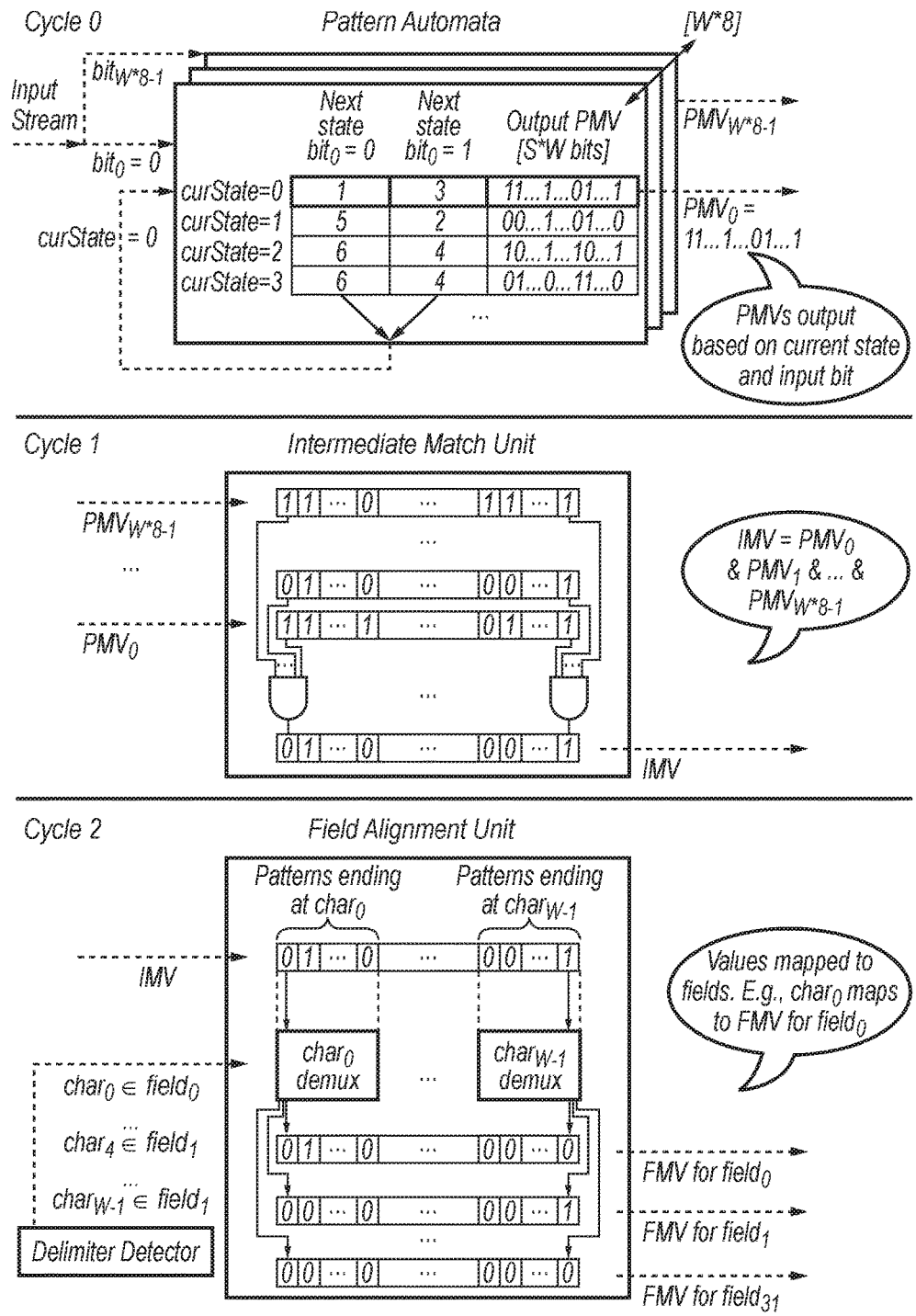
Figure 11:
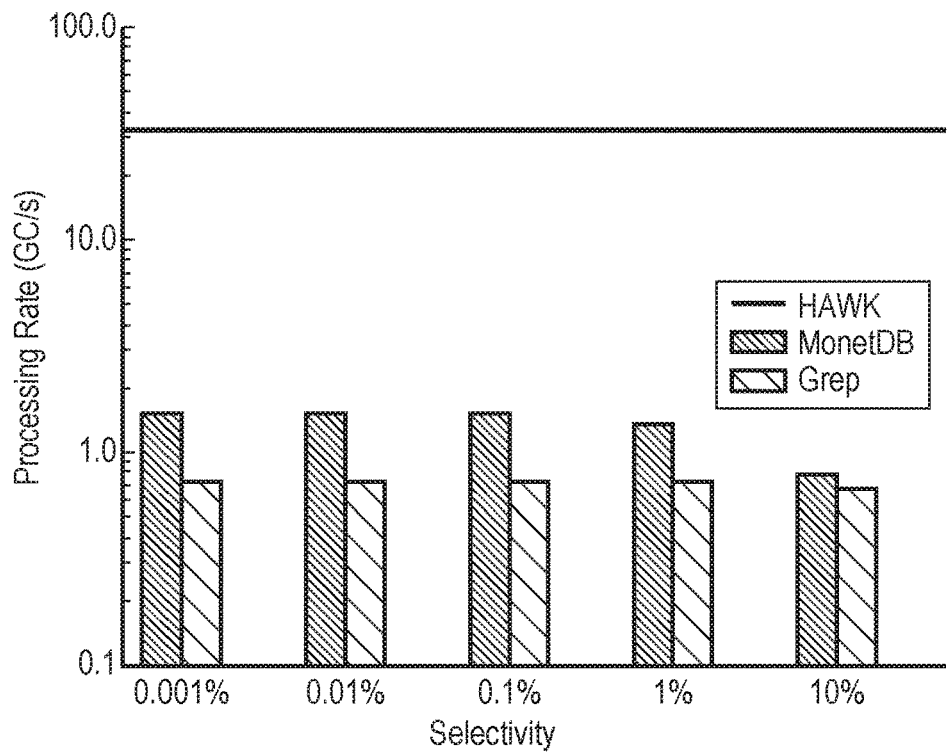
Figure 12:
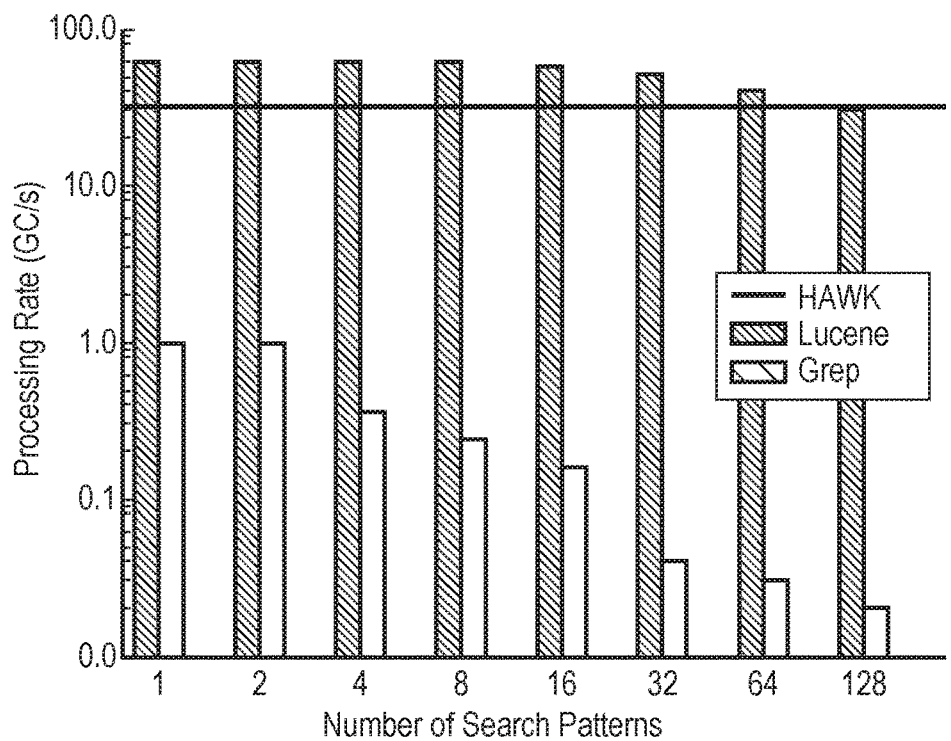
Figure 13:
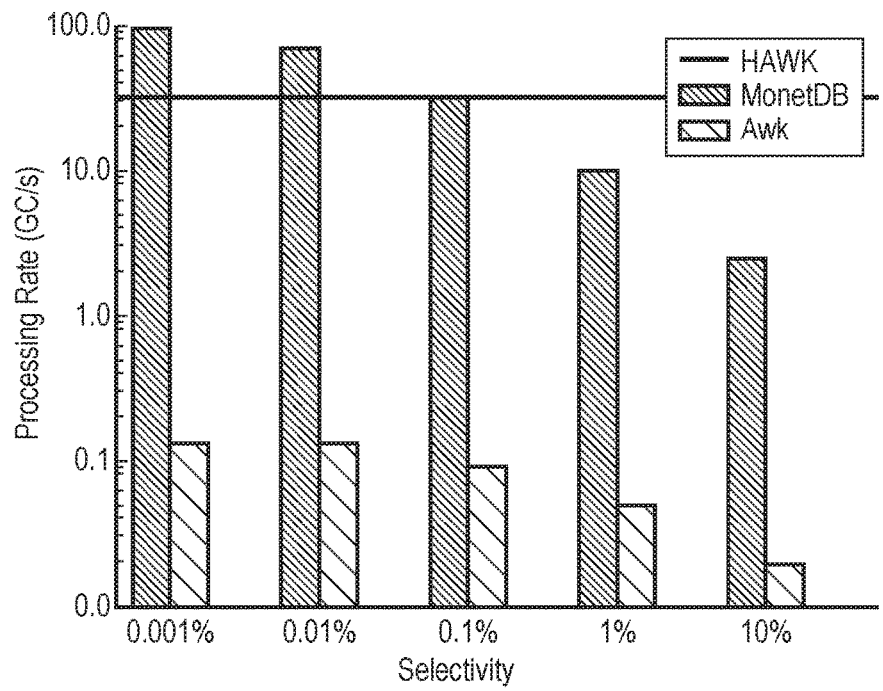
Figure 14:
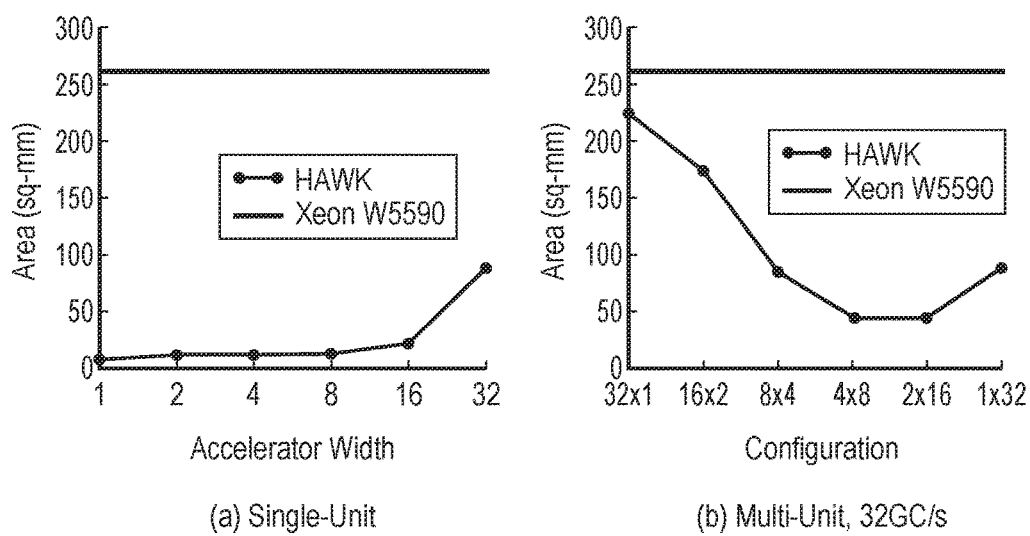
Figure 15:
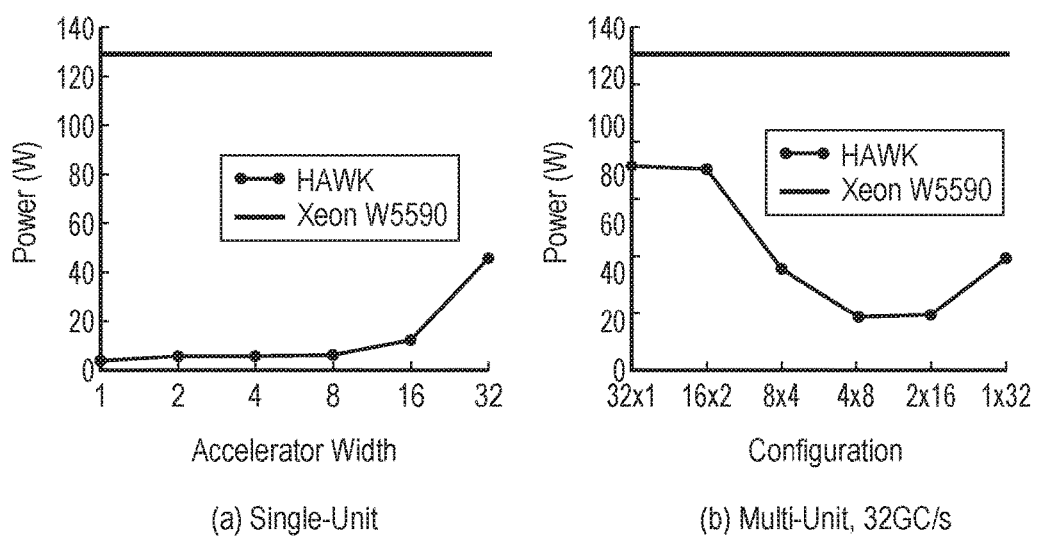

FIG. 6 schematically illustrates a sample log file;

FIG. 7 schematically illustrates an Aho-Corasick pattern matching automaton—search patterns are he, she, his and hers, states 2, 5, 7, and 9 are accepting states;

FIG. 8 schematically illustrates a block diagram of an accelerator architecture;

FIG. 9 schematically illustrates a three-step compiler operation for a 4-wide accelerator and three search terms (W=4, S=3);

FIG. 10 schematically illustrates operation of the major string matching subunits over three cycles;

FIG. 11 schematically illustrates query performance for the single pattern search task on synthetic data, across varying selectivities:

FIG. 12 schematically illustrates query performance on real-world text data, for varying numbers of search patterns;

FIG. 13 schematically illustrates query performance for complex predicates task, across varying selectivities;

FIG. 14 schematically illustrates area requirements for various accelerator widths and configurations (compared to a Xeon W5590 chip);

FIG. 15 schematically illustrates power requirements for various accelerator widths and configurations (compared to a Xeon W5590 chip).

EMBODIMENTS

Figure 1:
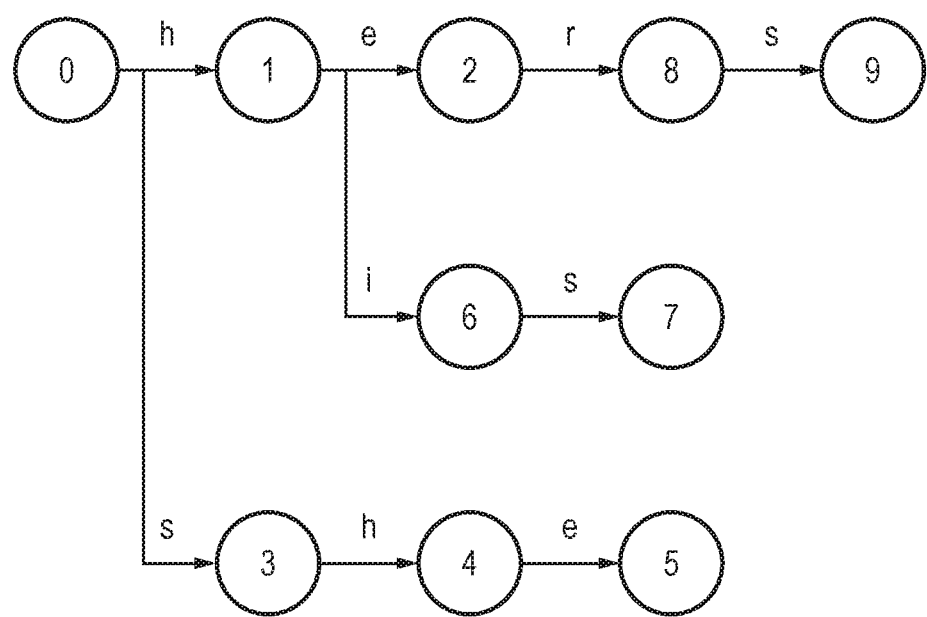
FIG. 1 illustrates an Aho-Corasick state machine.
Figure 2:
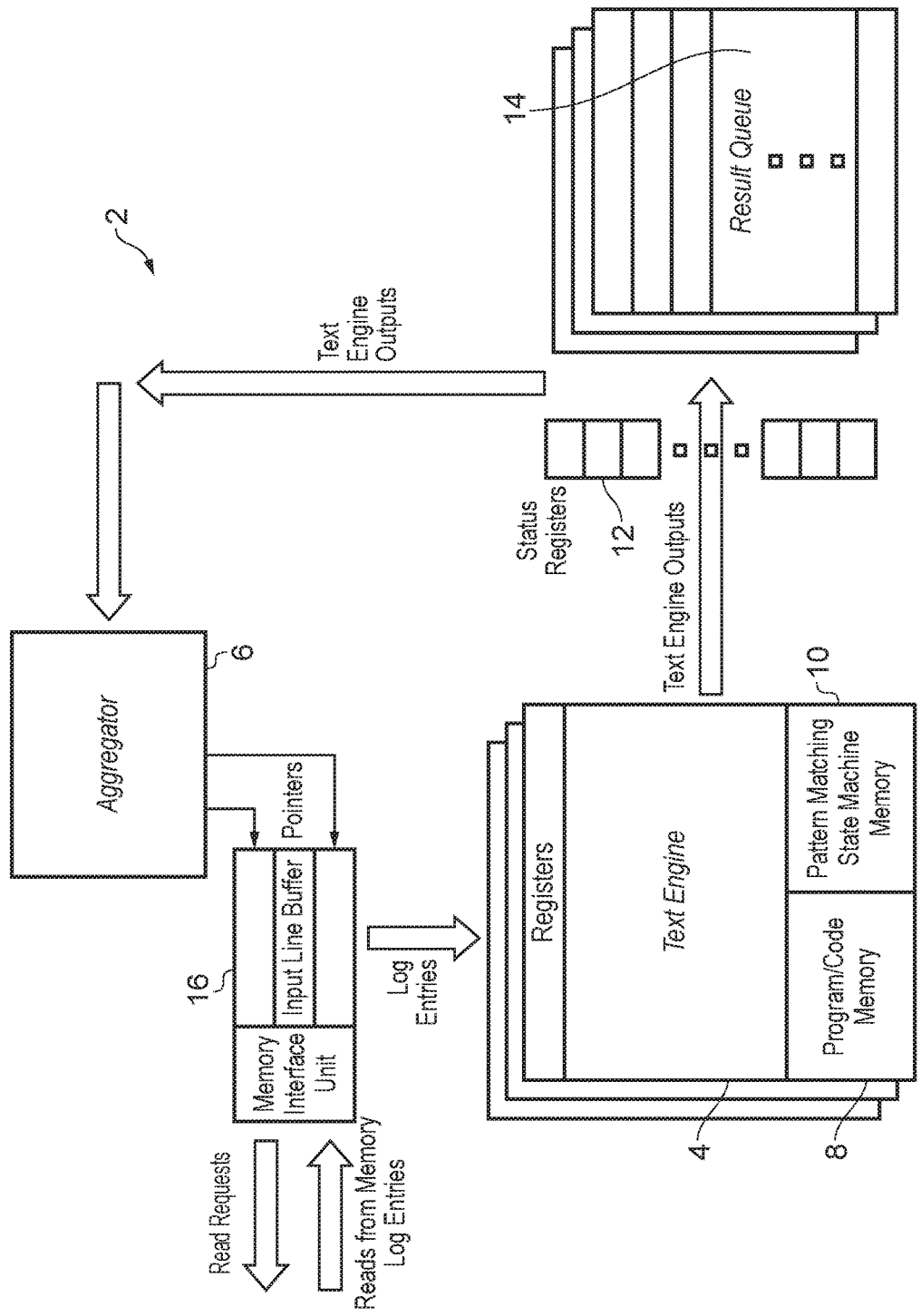
FIG. 2 illustrates a state machine architecture.

FIG. 2 shows the architecture of an accelerator design. The programmable accelerator 2 consists of a set of text engines 4 (TEs) (hardware execution units) which operate upon lines of the input log files and determine whether to accept or reject each line; status registers that list whether the TEs are running, have matched a line successfully, or failed at matching; result queues with 32-bit entries into which the TEs place their results when accepting a line; and, an aggregator 6 that post-processes the results written out by the TEs. User queries are converted into machine code (programs) by a compiler; these compiled queries are assigned to the TEs for further analysis. Compiled programs that do not fit fully within each TE's memory are split (sharded) across multiple TEs.

The compiler takes in user queries and generates programs that run on the text engines 4 (TEs). If a query is very large and entails a program whose size exceeds the TE memory, the compiler distributes the query across multiple programs; these programs are in turn distributed across multiple TEs. In addition to the program(s) associated with each query, the compiler also generates pattern matching state machines that are loaded on to each TE 4. Each pattern matching state machine is represented as a series of transition rules.

Text engines 4 (TEs) run compiled programs generated by the compiler for user queries. At a high level, each TE 4 consists of dedicated memory areas for programs 8 and pattern matching state machines 10, sixteen 32-bit general purpose registers, and hardware units that are responsible for running the compiled programs associated with user queries. Each TE 4 operates upon one line in the input log file at a time and returns a signal indicating whether the line is accepted or rejected. The aggregator 6 controls pointers (head pointer and tail pointer) into the input stream for each TE 4, and thereby controls availability of new lines for the TEs 4.

1) Program and Pattern Matching State Machine Memory:

Each TE contains 4 KB of program memory 8 and 8 KB of memory 10 dedicated to pattern matching state machines (the amounts of memory can vary). Any query that does not fit within the memory limits is distributed across multiple TEs 4. Each program consists of a sequence of custom instructions generated by the compiler. Pattern matching state machines, on the other hand, consist of sequences of transition rules. Each transition rule is of the form <current state, accepting state?, any character?, not character?, input character, next state, consume character?>. More details are provided in the appendices hereto. In some embodiments not all of these transition rules may be needed, e.g. "not character?" may not be needed 2) Instructions Supported: FIG. 3 Provides High-Level Descriptions of the Major Instructions Supported.

Each program that runs on a TE 4 is made up of a sequence of instructions, with the most notable instructions being matchString and matchNumber. Both instructions analyze the input stream one character at a time. Detailed descriptions of all instructions are provided in the appendices hereto.

matchString matches a specified string (represented by a corresponding pattern matching state machine) against the input stream. The pattern matching state machines, and therefore the instruction, support both exact string matches and regular expressions. The instruction advances the pattern matching state machine to its next state every cycle based on the current state and next input character seen. The pattern matching state machine indicates a match upon entering an accepting state. The pattern matching state machine also supports state transitions that do not consume input characters; such transitions help identify the end and beginning of adjacent fields in the input stream.

The matchString instruction exits when a mismatch occurs or a match is found. If a mismatch is found, the program rejects the input line, notifies the aggregator 6 via status registers 12, and requests the aggregator 6 for a new line to process. If a match is found, the TE 4 writes out information specified in the program to result queues 14 from where the results are read by the aggregator 6. The information written out by matchString includes pointers to the matching string in the input line. Alternatively, for a bit split implementation, match string may output the ID of the state that just matched.

matchNumber analyzes the input streams for numbers, and identifies any number within the stream as a number and determines the value of that number (stored to an output operand register). Some other instructions associated with matchNumber include checkNumber which verifies whether the number seen on the input stream is greater than, less than, or equal to a specified value, and math which can perform mathematical operations on the number derived from the input stream (including, for example, instruction hashing, CRC generation, or signature generation using the observed value(s)).

The aggregator 6 serves two major functions. First, the aggregator 6 post-processes the results written to the result queues 14 generated by the TEs 4. Second, the aggregator 6 controls a pointer into the input stream for each TE 4, and allocates lines to the TEs 4 for processing. To improve performance, multiple input lines are stored in a buffer 16 described below. As TEs 4 process lines and write their results out to the result queues 14, the aggregator 6 pops processed lines, moves the pointers into the buffer 16, and thereby controls the addition of new unprocessed lines to the buffer. By controlling the position of each TE's pointer into the input line buffer, the aggregator 6 maintains loose synchronization across the TEs 4. Stated another way, the aggregator 6 ensures that a TE may only run ahead of another TE by no more than the depth of the input line buffer 16. The aggregator 6 can be implemented in custom hardware, or can be implemented in software on a simple general-purpose processor. We assume the latter below. An extension to the ISA of the general purpose core facilitates interaction between the aggregator 6 and the result queues.

The input line buffer 16 is responsible for storing multiple log file entries read from memory. The buffer interfaces with memory via the memory interface unit. The memory interface unit sends out requests for cache line sized pieces of data from memory. The memory interface unit uses the aggregator's TLB for its addressing-related needs. Whenever an entry in the input line buffer 6 becomes available, the memory interface unit sends out a read request to the memory hierarchy. When the requested data is returned from memory, the vacant entry in the input line buffer 6 is written to. Pointers into the input line buffer from the aggregator 6 control the requests for new data from the input line buffer.

Each logical TE 4 can write its results (i.e., registers) to its result queue 14. The result queue 14 is read by the aggregator 6 for subsequent processing of the entries. Once all the results associated with an input line have been read and processed by the aggregator, the pointers from the aggregator 6 into the input line buffer 16 are updated, and the entry can be overwritten by fresh lines from memory.

A few adjustments can be made to the design to improve performance.

A content addressable memory (CAM) to store the pattern matching state machines. The CAM enables access to matching transition rules within one cycle (as opposed to having to iterate through all the potentially matching transition rules over multiple cycles).

rProvision to allow for multiple characters to be evaluated per cycle. This feature is relevant for exact string matches, and uses comparators that are multiple bytes wide.

tAccelerator provides for the acceptance or rejection of a line by the TEs 4 at an early cycle.

Once the accept or reject decision has been communicated to the aggregator 6, the TE 4 proceeds to work on the next available line. However, this feature depends upon the quick detection of end of line characters in the input line buffer. This may be assisted through the use of N bytewide comparators, where N is equal to the width of the memory transaction size in bytes (i.e. cacheline size in bytes).

dPattern matching state machines can be stored more efficiently using bit-split state machines as proposed by Tan and Sherwood. The accelerator uses this algorithm to store exact match state machines.

More generally the TEs 4 may be programmed to select on a per-character basis which one of a plurality of different query algorithms to use, e.g. per-character pattern matching (e.g. Aho-Corasick), per-bit pattern matching (e.g. Tan and Sherwood) or a CAM based algorithm where multiple patterns are matched in parallel.

Figure 4:
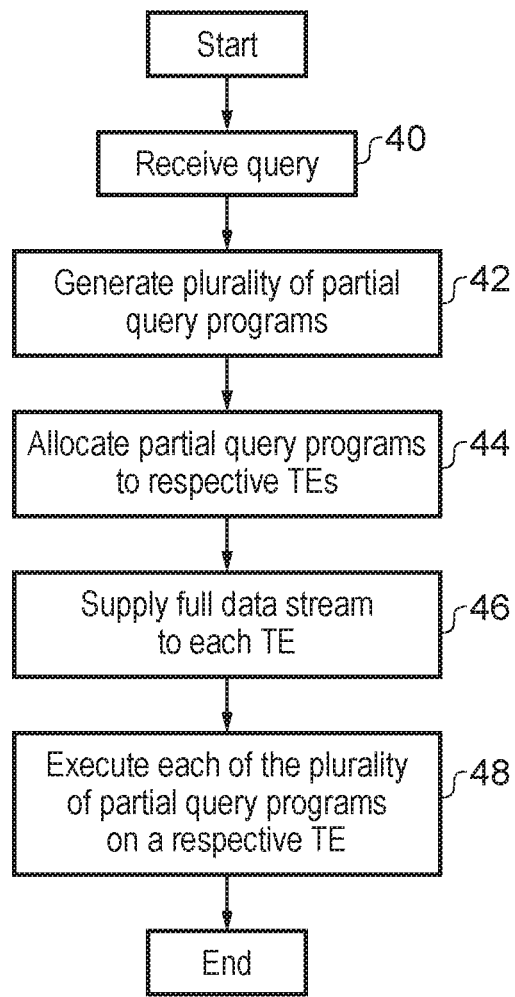
FIG. 4 is a flow diagram illustrating accelerator programming.

FIG. 4 schematically illustrates a flow diagram showing how a received query is divided (sharded) into a plurality of partial query program. At step 40 a query to be performed is received. Step 42 divides then receives query into a plurality of partial query programs. These partial query programs are selected such that they will have program instruction and state machine requirements which can be accommodated by an individual TE. Each of these partial query programs receives the full set of input data (the full stream of input characters) as an input to its processing. This technique can be considered to provide Multiple Program Single Data operation (MPSD). The multiple programs are different from each other in the general case, but together combine to provide the overall operation of the query receives at step 40. At step 44 the partial query programs are allocated to respective TE's for execution. At step 46 the full data stream is supplied to each TE. Accordingly, each TE receives the same input data. An individual TE may early terminate its access to the full stream of input data and so may not actually process all of the stream of input data. Nevertheless, the same full set of input data is available as an input, if required, by each of the TEs. At step 48, each of the plurality of partial query programs is executed by a respective TE using the full data stream supplied at step 46. It will be appreciated that in practice the steps 46 and 48 may be conducted in parallel with the full data stream being supplied in portions as the plurality of partial query programs are undergoing continuing execution by their respective TEs.

Figure 5:
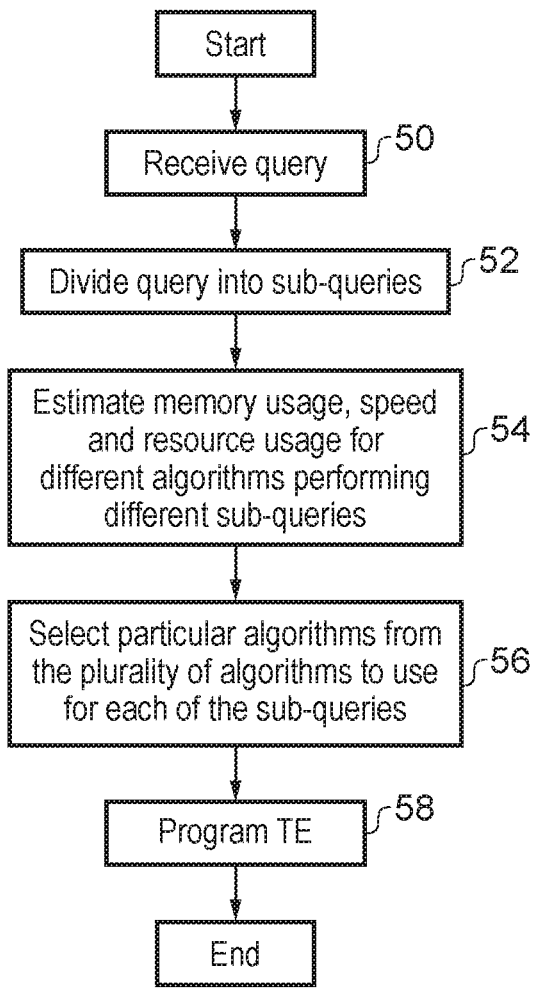
FIG. 5 is a flow diagram illustrating query algorithm selection.

FIG. 5 is a flow diagram schematically illustrating how different query algorithms may be selected to perform different portions of a query operation. As previously mentioned the different query algorithms may be selected for use with different portions of an overall query to be performed Each of the different algorithms can have associated advantages and disadvantages. As an example, the per-character pattern matching may be relatively storage efficient and be capable of being used to express a wide variety of different types of query, but may suffer from the disadvantage of being relatively slow to execute and potentially require the use of a hash table in order to access the data defining its state machines. A per-bit pattern matching algorithm may also be storage efficient and may be faster than a per-character pattern matching algorithm. However, a per-bit pattern matching algorithm is generally not amenable to performing queries other than those corresponding to exact matches. A content addressable memory based algorithm may have the advantage of being fast to operate, but has the disadvantage of a high over head in terms of circuit resources required and energy consumed.

Returning to FIG. 5, step 50 receives the query to be performed. This may be a full query or a partial query that has already been allocated to a particular TE. Step 52 divides the query received into a plurality of sub-queries whose performance for each of a plurality of different possible implementation algorithms may be evaluated. At step 54 the performance characteristics (e.g. memory usage, speed, resource usage etc.) for each of the plurality of different candidate algorithms in performing the different sub-queries is determined. Step 56 then serves to select particular algorithms from the plurality of algorithms to use for each of the sub-queries. The selection may be made so as to meet one or more of a program storage requirement limit of the TEs, a processing time limit and/or a hardware resources limit of the one or more TEs (e.g. CAM storage location availability). At step 58 the TE concerned is programmed. The algorithm used may be varied as the TE progresses through the portion of the query processing allocated to it. The algorithm used may be varied on a per-character (or per group of character) basis as the sequences of characters are queried. In practice, the switching between the algorithms is likely to be less frequent than on a per-character basis.

The stream of character data with which the present techniques operate may be unindexed data. Such data (e.g. an unindexed sequence of character data, unindexed log data etc) provides a difficult query target for convention query mechanisms and accordingly the present techniques may provide improved querying performance for such data.

The aggregating which is performed by the aggregator 6 may be performed as a single processing operation upon a plurality partial results as generated by each TE. For example, the aggregator 6 could OR together a large number of partial results, AND together a large number of partial results, perform a mathematical operation upon a large number of partial results, or some other combination of logical or other manipulations upon the results. The aggregator 6 performs such processing upon the partial results as a single process, e.g. executing a single instruction or a small number of instructions.

The buffer 16 of FIG. 2 may include a delimiter store. As data is stored into the buffer 16, delimiter identifying circuitry serves to identify data delimiters between portions of the sequenced data as it is loaded. The delimiters may, for example, be end of line characters or other characters which delimit portions of the sequence of data. These portions may be irregular in size. The delimiter store may be accessed by the aggregator 6 in order to determine the start of a next portion of the sequence of data to be supplied to a TE 4 when it completes processing the current portion it is operating upon. This can speed up the operation of accelerator 2 by avoiding the need to search through the sequence of data to identify the start and end of each portion of that data which needs to be supplied to a TE. Instead, the delimiters may be identified once at load time and thereafter directly referred to by the aggregator 6. As previously mentioned, the different TEs 4 are free to query different portions of the data within the buffer 16 within the limits of the data held within the buffer 16. This keeps the TEs in loose synchronization. The aggregator 6 stores a head pointer and a tail pointer. The head pointer indicates the latest portion of the full data stream which has been loaded by the memory interface unit into the buffer from the main memory. The tail pointer indicates the earliest portion of the sequence of data for which pending processing is being performed by one of the TEs. Once the tail pointer moves beyond a given portion, that portion is then a candidate for being removed from the buffer 16.

As mentioned above, the TEs 4 support a matchNumber instruction. This is a number match program instruction and serves to identify a numeric variable and to determine a value of that numeric valuable located at a variable position within a sequence of characters. The numeric variable may take a variety of forms. For example, it may be an integer value, a floating point value or a date value. Other forms of numeric variable are also possible. The output of number match program instruction may comprise a number value stored within a register specified by the number match program instruction. This may be a selectable output register.

The performance of the accelerator 2 is compared against CPU based solutions for a variety of benchmarks. In the experiments the datasets and queries presented by Pavlo and co-authors are used (A. Pavlo, E. Paulson, A. Rasin, D. J. Abadi, D. J. DeWitt, S. Madden, and M. Stonebraker. A comparison of approaches to large-scale data analysis. In Proceedings of the 2009 ACM SIGMOD International Conference on Management of Data, SIGMOD '09, 2009). The following tasks and datasets described below are considered and used to evaluate the design using simulator. The number of simulator cycles are counted for a task, and the time required calculated for the task assuming a frequency of 1 GHz (other frequencies could also be used).

The expected performance of the design as reported by the simulator is compared against the time measured for each task on a Xeon-class server. Since 'awk' provides the functionality most relevant to the queries below, we utilize 'awk' on the real machine.

A. Task 1: Selection

Pavlo et al.'s dataset for the selection task consists of documents with the following structure <Page Rank, URL, Duration>. As in Pavlo et al., the present test query takes the form of select 'Page Rank, URL' where 'Page Rank>10'. The likelihood of a Page Rank being above 10, is almost 0.23%. Since the present design aims to rapidly reject or accept lines and then move to the next line, the last field in each line that needs to be evaluated plays an important role in the performance of the design. Therefore, the following considers the query, select 'URL, Duration' where 'Page Rank>10' to evaluate a scenario where the last character of each line needs to be evaluated.

B. Task 2: Grep

For the 'grep' task, the dataset consists of multiple 100-byte lines. Each 100-character line consists of a 10 character unique key, and a 90-character random pattern. The 90-character random pattern is chosen such that the string being searched for only occurs once per 30,000 lines. The query for the accelerator 2 in this case is: select line where line="*XYZ*". Note that for this query, all characters in a line will need to be evaluated if a match is not found.

C. Task 3: Aggregation

The aggregation task utilizes a dataset that consists of lines of the form <Source IP, Destination URL, Date, Ad Revenue, User, Country, Language, Search Word, Duration>. The task aims to calculate the total ad revenue associated with source IP, grouped by the source IP. Since the group by functionality is something that the aggregator takes care of, the query for the text engines is select 'Source IP, Ad Revenue'. Given the ad revenue value that gets returned to it, the aggregator can perform the group by operation using hash-tables.

Illustrative Y Results

Preliminary results obtained by comparing the performance of the simulated design versus running 'awk' on a real machine for the tasks listed in herein are discussed. The accelerator's 2 ability to reject or accept a line early provides advantages. Additionally, the accelerator 2 when evaluating more than one character per cycle provides significant advantages compared to CPU-based solutions.

A. Task 1: Selection

Consider the results for the query, select 'Page Rank, URL' where 'Page Rank>10' for the selection task. Recall that the dataset for this query consists of documents with the following structure <Page Rank, URL, Duration>.

| | |
|---|---|
| Accelerator Runtime (s) | 0.02 |
| Awk Runtime (s) | 1.5 |
| Speedup | 92× |

Next, we consider the results for the query, select 'URL, Duration' where 'Page Rank>10'.

| | |
|---|---|
| Accelerator Runtime (s) | 0.22 |
| Awk Runtime (s) | 1.5 |
| Speedup | 6.7× |

As shown in tables above (the precise values may vary depending upon the exact parameters used), the accelerator 2 shows almost a two orders of magnitude speedup compared to the CPU-based solution when Page Rank is selected. The main reason for the improved performance is the fact that the accelerator 2 is designed to reject or accept a line as soon as the last field that requires evaluation has been evaluated. Since only the first two fields need to be evaluated in this case, a line can be accepted or rejected as soon as the URL field has been completely seen. Further, since the likelihood of finding an acceptable Page Rank is only 0.23%, many lines are rejected as soon as the Page Rank field has been evaluated and found to mismatch.

However, in the case where Duration has to be selected, the third field has to be completely seen before any accept or reject decision can be made. Additionally, the likelihood of a line having an acceptable Duration value is almost 385× the likelihood of finding an acceptable Page Rank. This, in turn, increases the number of characters that need to be evaluated.

B. Task 2: Grep

Next, the results for the query, select line where line="*XYZ*", for the grep task are considered. The dataset for this query consists of lines with 100-characters each. Each line consists of a 10 character unique key, and a 90-character random pattern.

| | |
|---|---|
| Accelerator Runtime (s) | 0.19 |
| Awk Runtime (s) | 0.41 |
| Speedup | 2× |

As with the second selection query, the grep query requires the entire line to be evaluated in the worst case. Since the likelihood of finding a matching a line is 1/30,000, most lines are read completely before being rejected. While the speedup value for the grep task is not very high, it needs to be noted that the pattern matching state machine for this task (query) is rather small. With large pattern matching states machines that do not fit within CPU caches, we expect the speedup afforded by the accelerator to be significantly higher.

C. Task 3: Aggregation

Finally, the results for the query, select 'Source IP, Ad Revenue' executed on a dataset of the form <Source IP, Destination URL, Date, Ad Revenue, User, Country, Language, Search Word, Duration> are considered (the precise values may vary depending upon the parameters used).

| | |
|---|---|
| Accelerator Runtime (s) | 0.01 |
| Awk Runtime (s) | 0.15 |
| Speedup | 15.7× |

Again, the feature that the accelerator can reject lines early provides a significant advantage, and the speedup compared to 'awk' running on a Xeon-core is almost 16.

A further example embodiment will now be described below with reference to FIGS. 6 to 15.

High-velocity text data have undergone explosive growth in recent years and will continue to do so. Traditional software-based tools for processing these large text corpora use memory bandwidth inefficiently due to software overheads and thus fall far short of peak scan rates possible on modern memory systems. In the following is described HAWK, a custom hardware accelerator for ad hoc queries against large in-memory logs. HAWK is designed to process data at a constant rate of 32 GB/s-faster than most extant memory systems. HAWK outperforms known software solutions for text processing. HAWK occupies an area of 45 mm2 in its pareto-optimal configuration and consumes 22 W of power, well within the area and power envelopes of modern CPU chips.

Introduction

High-velocity electronic text log data—such as system logs, social media updates, web documents, blog posts, and news articles—have undergone explosive growth in recent years [25]. These textual logs can hold useful information for time-sensitive domains, such as diagnosing distributed system failures, online ad pricing, and financial intelligence. For example, a system administrator might want to find all HTTP log entries that mention a certain URL. A financial intelligence application might search for spikes in the number of Tweets that contain the phrase can't find a job. Queries on this high-velocity text data are often ad hoc, highly-selective, and latency-intolerant. That is, the workload is not known ahead of time; the queries often ignore the vast majority of the corpus; and query answers should be generated quickly and reflect up-to-the-second data.

Memory-resident databases have recently become a popular architectural solution, not simply for transactional [17, 28] workloads but for analytical ones [19, 26, 27, 35] as well.

Storing data in RAM admits fast random seeks and fast scan behavior, potentially making such databases good matches for ad hoc and latency-intolerant log query systems. Although RAM storage costs are higher than other technologies, they are falling over time and are likely already acceptable for many datasets. (E.g., Twitter's own search engine now stores recent data in RAM [8].)

Because time constraints and varied workloads make index construction impractical, the ad hoc log query system's performance will depend on its ability to scan and select from the contents of memory. When performing an in-memory scan-and-select on traditional modern hardware, memory bandwidth—the rate at which the architecture supports transfers from RAM to the CPU for processing—sets an upper bound on the speed of the scan.

Unfortunately, existing systems and tools do not come close to saturating available memory bandwidth. For example, for a state-of-the-art in-memory database, may have a peak scan rate of 2 GB/s of data, far short of the 17 GB/s RAM-to-CPU DDR3 channel offered by modern architectures. Non-database textual tools, such as grep and awk, perform even worse, sometimes by orders of magnitude. The gap arises because these tools execute many instructions, on average, for each character of input they scan. Thus instruction execution throughput, rather than memory bandwidth, becomes the performance limiter. Nor is it clear that growth in CPU cores can solve the problem, as memory bandwidths also continue to improve (e.g., with the proliferation of DDR4).

System Goal—there are many questions to answer when building an in-memory analytical database, but the following system focuses on one: can we saturate memory bandwidth when processing text log queries? If so, the resulting system could be used directly in grep- and awk-style tools, and integrated as a query processing component in memory-resident relational systems.

Of interest are designs that include both software and hardware elements. Although hardware accelerators have had a mixed history in data management systems, there is reason to be newly optimistic about their future. The anticipated end of CMOS voltage scaling (a.k.a. Dennard scaling) has led experts to predict the advent of chips with "dark silicon"; that is, chips that are designed to have a substantial portion powered down at any given time [5, 11, 24, 31]. This forecast has renewed interest in domain specific hardware accelerators that can create value from otherwise dark portions of a chip-accelerators powered only when especially needed. Researchers have recently proposed several hardware designs tailored for data management [14, 34]. Further, recently-announced chip designs include field programmable gate array (FPGA) elements [7], making a domain-specific hardware accelerator—implemented in FPGAs—more practical and promising. There has also been substantial recent interest in using FPGAs for database query processing [13, 20, 32, and 33].

Technical Challenge—it is not surprising that current software systems on standard cores perform poorly. Most text processing systems use pattern matching state machines as a central abstraction, and standard cores that implement these machines in software can require tens of instructions per character of input. Further, there is a central challenge in efficiently representing state machines for large alphabets and complex queries; the resulting transition matrices are sparse, large, and randomly accessed, leading to poor hardware cache performance.

In this work, we set an objective of processing in-memory ASCII text at 32 giga-characters per second (GC/s), corresponding to a 32 GB/s data rate from memory—a convenient power of two expected to be within the typical capability of near-future high-end servers incorporating several DDR3 or DDR4 memory channels. We investigate whether a custom hardware component can reach this performance level, and how much power and silicon area it takes. Achieving this processing rate with conventional multicore parallelism (e.g., by sharding the log data into subsets, one per core) is infeasible; measurements of a state-of-the-art in-memory database suggest that chips would require nearly 20× more cores than are currently commonplace in order to reach this level of performance.

Proposed Approach—a combination of a custom hardware accelerator and an accompanying software query compiler for performing selections queries over in-memory text data. When the user's query arrives, the compiler creates a pattern matching finite state automaton that encodes the query and transmits it to the custom hardware component; the hardware accelerator then executes it, recording the memory addresses of all text elements that satisfy the query. This list of results can then be used by the larger data management software to present results to the user, or as intermediate results in a larger query plan.

The present disclosure exploits two central observations to obtain fast processing while still using a reasonable hardware resource bud-get. First, the accelerator is designed to operate at a fixed scan rate: it always scans and selects text data at the same rate, regardless of the data or the query, streaming data sequentially from memory at 32 GB/s. Such performance predictability can be achieved because the scan engine requires no control flow or caches; hence, the hardware scan pipeline does not stall and can operate at a fixed 1 GHz frequency, processing 32 input characters per clock cycle. This approach allows the system to avoid the cache misses, branch mispredictions, and other aspects of CPUs that make performance unpredictable and require area-intensive hardware to mitigate.

Second, the system uses a novel formulation of the automata that implement the scan operation, thereby enabling a hardware implementation that can process many characters concurrently while keeping on-chip storage requirements relatively small. This conceptually concatenates 32 consecutive characters into a single symbol, allowing a single state transition to process all 32 characters. Naively transforming the input alphabet in this way leads to intractable state machines—the number of outgoing edges from each state is too large to enable fixed-latency transitions. So, the system leverages the concept of bit-split pattern matching automata [30], wherein the original automaton is replaced with a vector of automata that each processes only a bit of input. As a result, each per-bit state requires only two outgoing transitions. Matches are reported when the vector of automata have all recognized the same search pattern.

Contributions and Outline—the core contributions of this disclosure are as follows:
1. There are described a typical log processing query workload, describe known possible solutions (that are unsuitable), and there is provided some background information about conventional approaches (Sections 2 and 3).
2. HAWK is described, a hardware accelerator design with a fixed scan-and-select processing rate. HAWK employs automata sharding to break the user's query across many parallel processing elements. The design is orthogonal to standard data sharding (i.e., breaking the dataset into independent parts for parallel processing), and can be combined with that approach if desired (Sections 4 and 5).

3. There is demonstrated, using simulation, hardware synthesis, and real-world software tests, that HAWK can saturate modern memory bandwidths, and can obtain processing rates that are orders of magnitude faster than standard in-memory databases and tools. Indeed, the scan operations are fast enough that they are often competitive with software solutions that utilize pre-computed indexes. HAWK's hardware requirements are modest enough to be implementable given the resources on a server-class chip (Section 6).

Problem Description

This example disclosure focuses on the single problem of fast in-memory scans of textual and log-style data, a crucial task for a range of data management tools, including in-memory relational databases performing in-situ data processing, log processing tools such as Splunk [3], file-centric command-line tools such as grep, awk, and visualization programs. FIG. 6 shows a brief example of such data.

Of particular interest are settings where log data arrive quickly and should be queried rapidly. Examples of such workloads include analytics for network security, de-bugging and performance analysis of distributed applications, online advertising clickstreams, financial trading applications, and multiplayer online games. More speculative applications could include news discovery and trend analysis from Twitter or other online text sources. The query workload is a mixture of standing queries that can be precompiled and ad hoc ones that are driven by humans or by automated responses to previous query results.

In this section, the disclosure covers the user-facing desiderata of such a system, including the data model and query language. Then, the disclosure considers traditional software solutions for such queries and why hardware acceleration is desirable.

Desiderata for a Log Processing System

The disclosure now briefly describes the types of data and queries that the system aims to manage.

Data Characteristics—the text to be queried is log-style information derived from Web servers or other log output from server-style software. Imagine a single textual dataset that represents a set of records, each consisting of a number of fields. Delimiters specify the end of each record and each field; the number of fields per record is variable. Because the text arrives very rapidly in response to external system activity, there is no premade indexing structure (e.g., a B+Tree) available. The logs are append-style, so the records are sorted by arrival time.

Query Language—the data processing system should answer selection and projection queries over the aforementioned data. Fields are simply referred to by their field number. For example, for the data in FIG. 6, a user might want to ask:
SELECT $3, $5 WHERE $7=200 AND
($5="132.199.200.201" OR $5="100.202.444.1")
The system uses default field and record delimiters, but the user can specify them explicitly if needed:
SELECT $3, $5 WHERE $7=200 AND
($5="132.199.200.201" OR $5="100.202.444.1")
FIELD_DELIM='/'
RECORD_DELIM=':'
The system should support boolean predicates on numeric fields (=, < >, >, <, <=, =<) and textual ones (equality and LIKE).

Query Workload—The disclosure assumes queries that have four salient characteristics. First, they are ad hoc, possibly written in response to ongoing shifts in the incoming log data, such as in financial trading, social media intelligence, or network log analysis. This changing workload means that even if there were the time to create an index in advance, it would not be clear as to which indexes to construct.

Second, queries are time-sensitive: the user expects an answer as soon as possible, perhaps so the user can exploit the quick-moving logged phenomenon that caused them to write the query in the first place. This need for fast answers further undermines the case for an index: the user cannot wait for the upfront indexing cost.

Third, queries are highly selective: the vast majority of the log data will be irrelevant to the user. The user is primarily interested in a small number of very relevant rows in the log. As a result, although the system offers projections, it is not designed primarily for the large aggregations that motivate columnar storage systems.

Fourth, queries may entail many equality tests: it is believed that when querying logs, it will be especially useful for query authors to test a field against a large number of constants. For example, imagine the user wants to see all log entries from a list of suspicious users:
SELECT $1, $2, $3 WHERE $3='user1'
OR $3='user2' OR $3='user3' OR . . . .
Or imagine a website administrator wants to examine latency statistics from a handful of "problem URLs":
SELECT $1, $4, WHERE $1='/foo.html'
OR $3='/bar.html' OR . . . .
If it is assumed that the list of string constants—the set of user-names or the set of problematic URLs—is derived from a relation, these queries can be thought of as implementing a semi join between a column of data in the log and a notional relation from elsewhere [10]. This use case is so common that the system has explicit support for it in both the query language and the execution runtime. For example, the user can thus more compactly write:
SELECT $1, $4 WHERE $4={"problemurls.txt"}
for a query logically equivalent to the one above.

When integrating HAWK with the software stack and interacting with the user, the disclosure envisions at least two possible scenarios. The first usage scenario involves close integration with a data management tool. When the database engine encounters an ad hoc query, the query is handed off to the accelerator for processing, potentially freeing up the server cores for other processing tasks. Once the accelerator has completed execution, it returns pointers in memory to the concrete results. The database then retakes control and examines the results either for further processing (such as aggregation) or to return to the user. This scenario can be generalized to include non-database text processing software, such as grep and awk.

The second usage scenario involves a stand-alone deployment, in which a user submits queries directly to the accelerator (via a minimal systems software interface) and the accelerator returns responses directly to the user. In either case, the RDBMS software and the user cannot interact entirely directly with the hardware. Rather, they use the hardware-specific query compiler we describe in Section 5.1.

Conventional Solutions

Today, scan operations like the disclosure considers are typically processed entirely in software. Simple text processing is often performed with command-line tools like grep and awk, while more complex scan predicates are more efficiently processed in column-store relational databases, such as Monet DB [17] and Vertica [15]. Keyword search is typically performed using specialized tools with pre-computed indexes, such as Lucene [18] or the Yahoo S4 framework [21]. However, software-implemented scans fall well short of the theoretical peak memory bandwidth available on modern hardware because scan algorithms must execute numerous instructions (typically tens, and sometimes hundreds) per byte scanned. Furthermore, conventional text scanning algorithms require large state transition table data structures that cause many cache misses. For the present design goal of 32 GC/s, and a target accelerator clock frequency of 1 Giga-hertz, our system must process 32 characters each clock cycle. Given a conventional core's typical processing rates of at most a few instructions per cycle, and many stalls due to cache misses, a system would potentially require hundreds of cores to reach the present desired level of performance.

Indexes are clearly effective, but are also time-consuming and burdensome to compute. Traditional index generation is prohibitive for time-sensitive, ad hoc queries. Moreover, indexes rapidly become stale for high-velocity sources and are expensive to update.

Hardware-based solutions have been marketed for related applications, for example, IBM Netezza's data analytics appliances, which make use of FPGAs alongside traditional compute cores to speed up data analytics [13]. The present accelerator design could be deployed on such an integrated FPGA system. Some data management systems have turned to graphics processing units (GPUs) to accelerate scans. However, prior work has shown that GPUs are ill-suited for string matching problems [36], as these algorithms do not map well to the single instruction multiple thread (SIMT) parallelism offered by GPUs. Rather than rely on SIMT parallelism, the present accelerator, instead, is designed to efficiently implement the finite state automata that underlie text scans; in particular, the present accelerator incurs no stalls and avoids cache misses.

In short, existing software and hardware solutions are unlikely to reach the present goal of fully saturating memory bandwidths during scan—the most promising extant solution is perhaps the FPGA-driven technique. Therefore, the main topic of this disclosure is how to use dedicated hardware to support the aforementioned query language at our target processing rate.

Background

This disclosure briefly describes the classical algorithm for scanning text corpora, on which HAWK is based. The Aho-Corasick algorithm [4] is a widely used approach for scanning a text corpus for multiple search terms or patterns (denoted by the set S). Its asymptotic running time is linear in the sum of the searched text and pattern lengths. The algorithm encodes all the search patterns in a finite automaton that consumes the input text one character at a time. The Aho-Corasick automaton M is a 5-tuple (Q, α, δ, q0, A) comprising:

1. A finite set of states Q: Each state q in the automaton represents the longest prefix of patterns that match the recently consumed input characters.
2. A finite alphabet α
3. A transition function (δ: Q×a→Q): The automaton's transition matrix comprises two sets of edges, which, together, are closed over α. The goto function g(q, α_i) encodes transition edges from state q for in-put characters α_i, thereby extending the length of the matching prefix. These edges form a trie (prefix tree) of all patterns accepted by the automaton. The failure function f(q, ⁻i) encodes transition edges for input characters that do not extend a match.
4. A start state q0 ∈ Q, or the root node.
5. A set of accepting states A: A state is accepting if it consumes the last character of a pattern. An output function output(q) associates matching patterns with every state q. Note that an accepting state may emit multiple matches if several patterns share a common suffix.

FIG. 7 shows an example of an Aho-Corasick trie for the patterns 'he', 'she', 'his' and 'hers' (failure edges are not shown for simplicity).

Two challenges arise when seeking to use classical Aho-Corasick automata to meet our performance objective: (1) achieving deterministic lookup time, and (2) consuming input fast enough. To aid in our description of these challenges, we leverage the notation in Table 1.

TABLE 1

Notation.

| Parameter | Symbol |
|---|---|
| Alphabet | α |
| Set of search patterns | S |
| Set of states in pattern matching automaton | Q |
| Characters evaluated per cycle (accelerator width) | W |

Deterministic lookup time—a key challenge in implementing Aho-Corasick automata lies in the representation of the state transition functions, as various representations trade off space for time.

The transition functions can be compactly represented using various tree data structures, resulting in lookup time logarithmic in the number of edges that do not point to the root node (which do not need to be explicitly represented). Alternatively, the entire transition matrix can be encoded in a hash table, achieving amortized constant lookup time with a roughly constant space overhead relative to the most compact tree.

However, recall that the present objective is to process input characters at a constant rate, without any possibility of stalls in the hardware pipeline. This requires deterministic time per state transition to allow multiple automata to operate in lockstep on the same input stream. (As will become clear later, operating multiple automata in lockstep on the same input is central to the present design). Hence, neither logarithmic nor amortized constant transition time are sufficient.

Deterministic transition time is easily achieved if the transition function for each state is fully enumerated as a lookup table, provided the resulting lookup table is small enough to be accessed with constant latency (e.g., by loading it into an on-chip scratchpad memory). However, this representation results in an explosion in the space requirement for the machine: the required memory grows with $O(|\alpha||Q|\cdot\log(|Q|))$. This storage requirement rapidly outstrips what is feasible in dedicated on-chip storage. Storing transition tables in cacheable memory, as in a software implementation, again leads to non-deterministic access time.

Consuming multiple characters—A second challenge arises in consuming input characters fast enough to match the present design target of 32 GC/s. If only one character is processed per state transition, then the automaton must process state transitions at 32 GHz. However, there is no feasible memory structure that can be randomly accessed to determine the next state at this rate.

Instead, the automaton must consume multiple characters in a single transition. The automaton can be reformulated to consume the input W characters at a time, resulting in an input alphabet size of $|\alpha|^W$. However, this larger alphabet size leads to intractable hardware-storage requirements grow due to an increase in the number of outgoing transitions per state on the order of $O(|\alpha|^W \cdot \log|Q|)$. Moreover, the automaton must still accept patterns that are arbitrarily aligned with respect to the window of W bytes consumed in each transition. Accordingly for these alignments leads to $|Q|=O(|S| \cdot W)$ states. Hence, storage scales exponentially with W as $O(|S| \cdot W|\alpha|^W \log_2(|S|W))$.

HAWK uses a representation of Aho-Corasick automata that addresses the aforementioned challenges. In the next section, there is discussed the principle of HAWK's operation, and detail of the corresponding hardware design.

Hawk in Principle

The disclosure now describes the proposed system for processing text log queries at rates that meet or exceed memory bandwidth. First are described the central ideas that underlie the HAWK architecture. Then are described the architecture at a high-level before describing its core components: the query compiler, the pattern automaton units, the intermediate match unit, and the field alignment unit.

Preliminaries

Recall that this disclosure proposes a fixed scan rate system meaning that the amount of input processed is the same for each clock cycle: HAWK has no pipeline stalls or other variable-time operations. Since semiconductor manufacturing technology will limit the clock frequency (the system targets a 1 GHz clock), a way to obtain arbitrary scanning capacity with the present design is to increase the number of characters that can be processed at each clock cycle.

There are multiple possible deployment settings for the architecture: integrating into existing server systems as an on-chip accelerator (line integrated GPUs), or as a plug-in replacement for a CPU chip, or "programmed" into reconfigurable logic in a CPU-FPGA hybrid [7]. The most appropriate packaging depends on workload and manufacturing technology details that are outside the scope of this paper.

An accelerator instance is a sub-system of on-chip components that process a compiled query on a single text stream. It is possible to build a system comprising multiple accelerator instances to scale processing capability. Herein an accelerator instance's width W is considered as the number of characters processed per cycle. An accelerator instance that processes one character per cycle is called 1-wide, and an instance that processes 32 characters per cycle is called 32-wide. Thus, if the design target is 32 GB/s of scanning capacity, and the clock has a 1 GHz frequency, the system could deploy either a single 32-wide accelerator instance, or 32 1-wide accelerator instances. When deploying HAWK, an architect must decide how many accelerator instances should be manufactured, and of what width.

A common technique in data management systems is data sharding, in which the target data (in this case, the log text we want to query) is split over many processing elements and processed in parallel. The present architecture allows for data sharding—in which each accelerator instance independently processes a separate shard of the log text, sharing available memory bandwidth—but it is not the primary contribution of the disclosure. More interestingly, the architecture enables automata sharding, in which the user's query is split over multiple accelerator instances processing a single input text stream in lockstep. Automata sharding enables HAWK to process queries of increasing complexity (i.e., increasing numbers of distinct search patterns) despite fixed hardware resources in each accelerator instance. HAWK is designed to make automata sharding possible.

Key Idea

A key idea that enables HAWK to achieve wide, fixed-rate scanning is the reformulation of the classic Aho-Corasick automaton to process W characters per step with tractable storage. As previously explained, simply increasing the input alphabet to $|\alpha|W$ rapidly leads to intractable automata.

Instead, the system extends the concept of bit-split pattern matching automata [30] to reduce total storage requirements and partition large automata across multiple, small hardware units. Tan and Sherwood propose splitting a byte-based ($|\alpha|=2^8=256$) Aho-Corasick automaton into a vector of eight automata that each process a single bit of the input character. Each state in the original automaton thus corresponds to a vector of states in the bit-split automata. Similarly, each bit-split state maps to a set of patterns accepted in that state. When all eight automata accept the same pattern, a match is emitted.

Bit-split automata conserve storage in three ways. First, the number of transitions per state is reduced to 2, making it easier to store the transition matrix in a lookup table. Second, reduced fan-out from each state and skew in the input alphabet (i.e., ASCII text has little variation in high-order bit positions) results in increased prefix overlap. Third, the transition function of each automaton is distinct. Hence, the automata can be partitioned in separate storage and state IDs can be reused across automata, reducing the number of bits required to distinguish states.

A contribution of the present system is to extend the bit-split automata to process W characters per step. Instead of eight automata, the formulation requires W×8 automata to process W characters per step. The number of states in a single-bit machine is bounded in the length of the longest search term $L_{max}$. Since the automaton is a binary tree, the total number of nodes cannot exceed $2^{Lmax+1}-1$. A key observation is that the length of the longest search pattern is divided by W, so each bit-split state machine sees a pattern no longer than $$\frac{L\max}{W} + P,$$

with P being at most two characters added for alignment of the search term in the W-character window. |Q| for a single bit machine scales as $$O(2)\left[\frac{L\max}{W} + P + 1\right] = O(1)$$

in W. The storage in the bit-split state machines grows as $O(|S| W)$ to overcome the aforementioned alignment issue (reasons for this storage increase will become clear in subsequent sections). With W×8 bit-split machines, the total storage scales as $O(8 \cdot |S| \cdot W2)$, thereby effecting exponential storage savings compared to the byte-based automaton.

Design Overview

FIG. 8 shows a high-level block diagram of an accelerator design. At query time, the system compiles the user's query and sends the compiled query description to each accelerator instance. Each instance then scans the in-memory text log as a stream, constantly outputting data that should be sent to higher-level software components for further processing (say, to display on the screen or to add to an aggregate computation).

Major components of the design are:

A compiler that transforms the user's query into a form the hardware expects for query processing. Specifically, it generates a set of bit-split pattern matching automata for loading into the accelerator. These automata reflect the predicates in the user's query.

Pattern automaton hardware units that maintain and advance the bit-split automata. At each cycle, each pattern automaton unit consumes a single bit of in-memory text input. Because each automaton consumes only one bit at a time, it cannot tell by itself whether a pattern has matched. After consuming a bit, each automaton emits a partial match vector (PMV) representing the set of patterns that might have matched, based on the bit and the automaton's current state. For an accelerator instance of width W, there are W×8 pattern automaton units. For a query of |S| patterns, the partial match vector requires |S|×W bits.

The intermediate match hardware unit consumes PMVs from the pattern automata processing each bit position to determine their intersection. At each clock cycle, the intermediate match unit consumes W×8 PMVs, performing a logical AND operation over the bit-vectors to produce a single intermediate match vector (IMV) output. The IMV is the same length as the PMVs: |S|×W.

Finally, the field alignment unit determines the field within which each match indicated by the IMV is located. Pattern matching in all of the preceding steps takes place without regard to delimiter locations, and therefore, of fields and records in the input log file. This after-the-fact mapping of match locations to fields, which is a novel feature of the design, allows the system to avoid testing on field identity during pattern matching, and thereby avoids the conditionals and branch behavior that would undermine the fixed-rate scan design. If the field alignment unit finds that the IMV indicates a match for a field number that the user's query requested, then it returns the resulting final match vector (FMV) to the database software for post-processing. To simplify the design, the system caps the number of fields allowed in any record to 32—a number sufficient for most real-world log datasets.

Note that each accelerator instance supports searching for 128 distinct patterns. Therefore, the 32×1 configuration can process up to 32×128 patterns, the 16×2 configuration can process up to 16×128 distinct patterns, and the 1×32 configuration can process up to 1×128 distinct patterns. By varying the number of instances and their width, the designer can trade off pattern constraints, per-stream processing rate, and, as we shall see later, area and power requirements (see Section 6.3).

Hawk Architecture

There are now described the four elements of HAWK highlighted in FIG. 8 in detail.

Compiler

HAWK first compiles the user's query into pattern-matching automata. As mentioned previously, the system applies the concept of bit-split pattern matching automata [30] to shrink the total number of transition rules stored in each accelerator instance; otherwise, naively storing transition tables on chip would be prohibitive.

FIG. 9 conceptually depicts compilation for a 4-wide accelerator. Algorithm 1 provides details of the compilation algorithm. The compiler's input is a query in the form described above. After parsing the query, the compiler determines the set of all patterns S, which is the union of the patterns sought across all fields in the WHERE clause. S is sorted lexicographically and then sharded across accelerator instances (Line 1). Sharding S lexicographically maximizes prefix sharing within each bit-split automaton, reducing their sizes.

Next, the compiler transforms S to account for all possible alignments of each pattern within the W-character window processed each cycle. The compiler forms a new set S0 wherein each pattern in S is padded on the front and back with "don't care" characters to a length that is a multiple of W, forming W patterns for all possible alignments with respect to the W-character window (Lines 2-7). FIG. 4 shows an example of this padding for S={bit, byte, nibble} and W=4. For a one-wide machine, no padding is required. The compiler then generates bit-split automata for the padded search patterns in S0. We generate these bit-split automata according to the algorithm proposed by Tan and Sherwood [30] (summarized in Lines 9-16). A total of W×8 such automata are generated, one per input stream bit processed each cycle. Each state in these automata has only two outgoing edges, hence, the transition matrix is easy to represent in hardware. Automata are encoded as transition tables indexed by the state number. Each entry is a 3-tuple comprising the next state for inputs bits of zero and one and the PMV for the state. Each state's PMV represents the set of padded patterns in S' that are accepted by that automaton in that state. The compiler assigns each pattern a distinct bit position in the PMV (Line 21). The bit position corresponds to the pattern's end-location within the W-character input window as follows. The first S bits of the PMV are associated with the alignment where the last character of each search pattern is the first character in the W-character window. The second set of S bits corresponds to the next alignment which ends in the second character, and so on. Recall that as each pattern is padded W times, the alignments enumerate all end locations for the pattern within the W-character window. This assignment of bit positions for each padded pattern is used to resolve the precise location of the unpadded pattern during field matching (see below). It is important to note that the hardware does not store S0 directly. Rather, patterns are represented solely as bits in the PMV.

Pattern Automata

The pattern automata, shown in the first panel of FIG. 10, each process a single bit-split automaton. Each cycle, they each consume one bit from the input stream, determine the next state, and output one PMV indicating possible matches at that bit position.

Consider the pattern automaton responsible for bit 0 of the W×8-bit input stream (from FIG. 10). In cycle 0, the automaton's current state is 0. The combination of the current state and the incoming bit value indicates a lookup table entry; in this case, the incoming bit value is 0, so the lookup table indicates a next state of 1. The pattern automaton advances to this state and emits its associated PMV to the intermediate match unit for processing in the next cycle.

The transition table and PMV associated with each state are held in dedicated on-chip storage. The system uses dedicated storage to ensure each pattern automaton can determine its next state and output PMV in constant time.

(Accesses may be pipelined over several clock cycles, but, the present implementation requires only a single cycle at 1 GHz frequency).

Storage requirements for pattern automata may be determined empirically, e.g. select 128 search terms at random from an English dictionary and observe the number of states generated per automaton, round the maximum number of states required by any automaton to the next power of 2, and provision this storage for all automata.

TABLE 2

Provisioned storage - per bit-split state machine, and total.

| Accelerator Width (W) | 1 | 2 | 4 | 8 | 16 | 32 |
|---|---|---|---|---|---|---|
| Per Bit-split Machine Storage (KB) | 74.8 | 69.6 | 33.5 | 16.5 | 10.4 | 32.8 |
| Total Storage (MB) | 0.6 | 1.11 | 1.07 | 1.06 | 2.1 | 8.4 |

Table 2 shows the per-automaton and total storage allocation for a range of accelerator widths. The storage requirement per pattern automaton is comparable to a first-level data cache of a conventional CPU. We observe a few interesting trends. First, the per-automaton-storage is minimal for W=8 and W=16. Whereas the number of patterns grows with W (a consequence of our padding scheme), the number of states in each automaton shrinks due to an effective reduction in pattern length (a consequence of processing multiple characters simultaneously). At the same time, as the number of patterns grows, the PMV width increases. The reduction in states dominates the larger PMV widths until W=16. Beyond that point, the impact of increased PMV widths starts to dominate.

Note that the system conservatively provisions the same storage for all automata, despite the fact that ASCII is highly skewed and results in far more prefix sharing in high-order bit positions. This decision allows our accelerator to support non-ASCII representations and ensures symmetry in the hardware, which facilitates layout.

Intermediate Match Unit

The intermediate match unit (the middle panel of FIG. 10) calculates the intersection of the PMVs. A pattern is present at a particular location in the input stream only if it is reported in the PMVs of all pattern automata. The intermediate match unit is a wide and deep network of AND gates that computes the conjunction of the W×8|S|×W-bit PMVs. The result of this operation is the |S|×W-bit wide intermediate match vector, which is sent to the next processing stage. As with the pattern automata, the intermediate match unit's execution can be pipelined over an arbitrary number of clock cycles without impacting the throughput of the accelerator instance, but our 32-wide implementation requires only a single cycle.

FIG. 10 shows that the PMVs generated by the pattern automata in cycle 0 are visible to the intermediate match unit in cycle 1. The intermediate match unit performs a bitwise AND operation on all W×8|S|×W-bit PMVs and yields an IMV. In our example, the second and last bits of all PMVs are set; indicating that the padded patterns corresponding to these entries have been matched by all bit-split state machines: true matches. The intermediate match unit, therefore, outputs an IMV with these bits set as well.

Field Alignment Unit

HAWK's operation so far has ignored the locations of matches between the log text and the user's query; it can detect a match, but cannot tell whether the match is in the correct tuple field. The field alignment unit (the bottom panel of FIG. 10) reconstructs the association between pattern matches and fields. The output of the field alignment unit is an array of field match vectors (FMVs), one per field. Each vector has a bit per padded search pattern (|S|×W bits), which allow the user to determine the exact location of the matching pattern within the input stream. Bit i in FMV j indicates whether pattern i matched field j and the pattern's location within the input stream.

The field alignment unit receives two inputs. The first input is the |S|×W-bit IMV output from the intermediate match unit. This vector represents the patterns identified as true matches.

The second input comes from a specialized delimiter detector that is preloaded with user-specified delimiter characters. (The hardware design for the delimiter detector is straight-forward and is not detailed here for brevity). Each cycle, the delimiter detector emits a field ID for every character in the W-character window corresponding to the current IMV (overall, W field IDs).

Search patterns that end at a particular character location belong to the field indicated by the delimiter detector. Recall that bit positions in the PMVs (and hence, the IMV) identify the end-location of each padded search pattern within the current W-character window (see above). Thus for every end-location, the field alignment unit maps corresponding IMV bits to the correct field ID, and the respective FMV. The operation of the field alignment unit is a demultiplexing operation (see FIG. 5).

In cycle 2, the field alignment unit evaluates the window processed by the pattern automata in cycle 0 and by the intermediate match unit in cycle 1. In our example, the IMV's second and last bits are set, indicating that the corresponding patterns ending at character0 and character$w-1$ have matched in some fields. The delimiter detector indicates that character0 is in field0, and character$-1$ is in field1. Thus, the patterns ending at character0 are mapped to the FMV for field0, and the patterns ending at character$w-1$ are mapped to the FMV for field1. The mapped FMVs are subsequently sent to the post-processing software.

The field alignment unit hardware entails 32 AND operations for each bit of the IMV. Compared to the pattern matching automata, the area and power overheads are negligible.

Experimental Results

Three metrics of success can be used when evaluating HAWK. The most straightforward is query processing performance

TABLE 3

Server specifications.

| Chip | Intel E5630, 16-cores @ 2.53 GHz |
|---|---|
| Caches | 256 KB L1, 1 MB L2, 12 MB L3 |
| Memory Capacity | 128 GB |
| Memory Type | Dual-channel DDR3-800 |
| Max. Mem. Bandwidth | 12.8 GB/s | when compared to conventional solutions on a modern server. The remaining metrics describe HAWK's area and power requirements, the two hardware resource constraints that matter most to chip designers. We will show that when given hardware resources that are a fraction of those used by a Xeon chip, HAWK can reach its goal of 32 GC/s and can comfortably beat conventional query processing times, sometimes by multiple orders of magnitude.

Experimental Setup

HAWK's performance can be compared against four traditional text querying tools: awk, grep, MonetDB [17], and Lucene [18]. All conventional software is run on a Xeon-class server, with specs described in Table 3. Datasets are preloaded into memory, running an initial throwaway experiment to ensure data is hot. All experiments are repeated five times and report average performance.

HAWK is implemented in the Verilog hardware description language. An ASIC design is synthesized using Synopsys' DesignWare IP suite [29], which includes tools that give timing, area, and power estimates. (Synthesis estimates of area and power from such tools are part of conventional practice when testing novel hardware designs.)

Synthesizing an ASIC design entails choosing a target manufacturing technology for the device. The present example system targets a commercial 45 nm manufacturing technology with a nominal operating voltage of 0.72 V, and design for a clock frequency of 1 GHz. This technology is somewhat out of date; it is two generations behind the manufacturing technology used in the state-of-the-art Xeon chip for our conventional software performance measurements. Since power and area scale with the manufacturing technology, this discussion compares HAWK's power and area against a prior-generation Intel processor manufactured in the same technology.

The HAWK compiler is written in C. For the large memory-resident datasets expected to be processed, query compilation time is negligible relative to the runtime. Since the primary focus of this example system is on string pattern matching, the compiler software does not currently handle numeric fields automatically; numeric queries are combined by hand. However, extending the compiler to handle numeric predicates is straightforward.

The evaluation considers three example use cases for HAWK that stress various aspects of its functionality. In each case, a comparison is made to the relevant software alternatives.

Single Pattern Search

First consider the simplest possible task: a scan through the input text for a single, fixed string. A synthetic 64 GB dataset comprising 100-byte lines is generated. The text log synthesis method described by Pavlo et al., for a similar experiment [23] is used. The synthetic data is formulated to include target strings that match a notional user query with selectivities of 10%, 1%, 0.1%, 0.01%, and 0.001%. The queries needed to search for each of these strings and report matching lines are timed. HAWK is compared against a relational column-store database (MonetDB) and the UNIX grep tool. For MonetDB, the data is loaded into the database prior to query execution.

Multiple Pattern Search

Next, consider a semijoin-like task, wherein HAWK searches for multiple patterns in a real-world dataset, namely, the Wikipedia data dump (49 GB). Select patterns at random from an English dictionary; vary their number from one to 128. Compare against an inverted text index query processor (Lucene) and again grep. For Lucene, create the inverted index prior to query execution; indexing time is not included in the performance comparison. Lucene and grep handle certain small tokenization issues differently; to ensure they yield exactly the same search results, make some small formatting changes to the input Wikipedia text. Execute grep with the -Fw option, which optimizes its execution for patterns that contain no wildcards.

Complex Predicates

Finally, consider queries on a webserver-like log of the form <Source IP, Destination URL, Date, Ad Revenue, User Agent, Country, Language, Search Word, and Duration>. This dataset is also based on a format proposed by Pavlo and co-authors [23]. A complex query has selection criteria for multiple columns in the log. It takes the following form (add the COUNT element to the query so that MonetDB incurs only trivial aggregation costs and no materialization costs):
SELECT COUNT (*) FROM dataset WHERE ((Date in specified range)
AND (Ad Revenue within range)
AND (User Agent LIKE value2 OR User Agent LIKE . . . ) AND (Country LIKE value4 OR Country LIKE . . . )
AND (Language LIKE value6 OR Language LIKE . . . )
AND (Search Word LIKE value8 OR Search Word LIKE . . . ) AND (Duration within range)).

Tune the various query parameters to achieve selectivities of 10%, 1%, 0.1%, 0.01%, and 0.001%. Compare against equivalent queries executed with the relational column-store (MonetDB) and the UNIX tool awk.

Performance

The following contrasts the performance of HAWK to various soft-ware tools in GC/s. By design, HAWK achieves a performance of 32 GC/s, and there is no sensitivity to query selectivity or the number of patterns (provided the query fits within the available automaton state and PMV capacity). In contrast, the software tools show sensitivity to both these parameters, so they are varied in the experiments.

Single Pattern Search

FIG. 11 compares HAWK's single pattern search performance against MonetDB and grep. It is found that HAWK's constant 32 GC/s performance is over an order of magnitude better than either software tool, and neither comes close to saturating memory bandwidth. MonetDB's performance suffers somewhat when selectivity is high (above 1%), but neither grep nor MonetDB exhibit much sensitivity at lower selectivities.

Multiple Pattern Search

FIG. 12 compares HAWK against Lucene and grep when searching for multiple randomly-chosen words in the Wikipedia dataset. For Lucene, query formulations are explored that search for multiple patterns in a single query or execute separate queries in parallel and report the best result.

Grep's performance is poor: its already poor performance for single-pattern search (1 GC/s) drops precipitously as the number of patterns increases, to as little as 20 megacharacters/s in the 128-word case. Unsurprisingly, because it uses an index and does not actually scan the input text, Lucene provides the highest performance. Its performance is reported by dividing query execution time by the size of the data set to obtain an equivalent GC/s scan rate. Note that this equivalent scan rate exceeds available memory bandwidth in many cases (i.e., no scan-based approach can reach this performance).

The results show that, when the number of patterns is large. HAWK is competitive with Lucene even though HAWK does not have access to a pre-computed inverted index. In the 128-pattern case, Lucene's performance of 30.4 GC/s falls short of the 32 GC/s performance of HAWK. At best, Lucene outperforms HAWK by a factor of two for this data set size (its advantage may grow for larger data sets, since HAWK's runtime is linear in the dataset size). Of course, these measurements do not include the 30 minutes of pre-query processing time that Lucene requires to build the index. (As a point of comparison, our automata compile times are on the order of seconds.) As a result, even though Lucene's query processing times are faster when the set of patterns is small, HAWK is a better fit in our target ad hoc scenario, in which the text corpus is changing rapidly enough to make indexing impractical.

Complex Predicates

FIG. 13 compares HAWK, MonetDB, and awk on the complex queries described above. MonetDB performance spans a 45× range as selectivity changes from 10% to 0.001%. When selectivity is low, MonetDB can order the evaluation of the query predicates to rapidly rule out most tuples, avoiding the need to access most data in the database. For 0.001% selectivity, it outperforms HAWK by 3×. However, for less selective queries, where MonetDB must scan large text fields in most tuples, HAWK provides superior performance, with more than 10× advantage at 10% selectivity. The performance of awk is not competitive.

Area and Power

TABLE 4

Component area and power needs for 1-wide and 32-wide configurations.

| | 1-wide | | 32-wide | |
| --- | --- | --- | --- | --- |
| Unit | Area (mm$^2$) | Power (mW) | Area (mm$^2$) | Power (mW) |
| Pattern Automata | 5.7 | 2002 | 86 | 44,563 |
| Intermediate Match Unit | <0.1 | <1 | <1 | 35 |
| Field Alignment Unit | <1 | 14 | 1 | 448 |
| Delimiter Detector | 1.1 | <1 | <1 | <1 |
| Numeric Units | <0.1 | 1 | <1 | 30 |
| Other Content Logic | 0.2 | 26 | 1 | 146 |
| Total | 7.1 | 2644 | 89 | 45,231 |

A breakdown of a HAWK instance's per-sub-component area and power estimates for two extreme design points, 1-wide and 32-wide is given in Table 4. For both designs, the pattern automata account for the vast majority of area and power consumption. Pattern automata area and power are dominated by the large storage structures required for the state transition matrix and PMVs2. The pattern automata storage is synthesized with large arrays of flip-flops. Area and power are expected to be reduced by up to a factor of two if the design were to use register files instead. The impact that state machine size has on the implementation can be seen. Even with the drastic savings afforded by the bit-split technique, the automata storage requirements are still large; without the technique, they would render the accelerator impractical. FIGS. 14 and 15 compare the area and power requirements of HAWK to an Intel Xeon W5590 chip [2]. That chip uses the same generation of 45 nm manufacturing technology as our synthesized design. A 1-wide HAWK instance is found to require only 3% of the area and 2% of the power of the Xeon chip. A 32-wide HAWK requires 42% of the area and 35% of the power of the Xeon processor. Although these values are high, they would improve when using more modern manufacturing technology; a 32-wide HAWK instance might occupy roughly one-sixth the area of a modern server-class chip.

FIGS. 14 and 15 also reveal an interesting trend. The 8-wide (4×8) and 16-wide (2×16) HAWK configurations utilize resources more efficiently (better performance per area or Watt) than other configurations. This saddle point arises due to two opposing trends. Initially, as width W increases from 1, the maximum padded pattern length (Lmax) per bit-split automaton decreases rapidly. Since each bit-split automaton is a binary tree, lower Lmax yields a shallower tree (i.e., fewer states) with more prefix sharing across patterns. Overall, the reduced number of states translates into reduced storage costs.

However, as W continues to grow, Lmax saturates at a minimum while the set of padded patterns, S0, grows proportionally to |S|×W. Each pattern requires a distinct bit in the PMV, which increases the storage cost per state. Above W=16, the increased area and power requirements of the wide match vectors outweigh the savings from reduced Lmax, and total resource requirements increase.

Overall, the 8-wide and 16-wide configurations strike the best balance between these opposing phenomena. It is more efficient to replace one 32-wide accelerator with four 8-wide accelerators or two 16-wide accelerators. The 4×8 configuration, which exhibits the lowest area and power costs, is found to require approximately 0.5× area and 0.48× power compared to the 32-wide accelerator, while maintaining the same performance. Compared to the W5590, the 4×8 configuration occupies about 0.21× the area and requires 0.17× the power. From a deployment perspective, using four 8-wide accelerators (4×8) is recommended to obtain an advantageous performance-efficiency trade-off.

CONCLUSION

High-velocity text log data have undergone explosive growth in recent years. Data management systems that rely on index-driven approaches cannot apply to this workload, and conventional scan-based mechanisms do not come close to exploiting the full capacity of modern hardware architectures. The HAWK accelerator can process data at a constant rate of 32 GB/s. HAWK is often better than state-of-the-art software solutions for text processing.

REFERENCES

[1] Apache Hadoop. http://hadoop.apache.org.
[2] Intel W5590 Processor Specifications. http://ark.intel.com/products/41643.
[3] Splunk. http://www.splunk.com.
[4] A. V. Aho and M. J. Corasick. E cient String Matching: An Aid to Bibliographic Search. Commun. ACM, 18(6), June 1975.
[5] S. Borkar and A. A. Chien. The Future of Microprocessors. Communications of the ACM, 54(5):67-77, May 2011.
[6] A. Bremler-Barr, D. Hay, and Y. Koral. CompactDFA: Generic State Machine Compression for Scalable Pattern Matching. In Proc. INFOCOM, 2010.
[7] D. Bryant. Disrupting the Data Center to Create the Digital Services Economy. Intel Corporation, 2014.
[8] M. Busch. K. Gade, B. Larson, P. Lok, S. Luckenbill, and J. Lin. Earlybird: Real-Time Search at Twitter. In Proc. International Conference on Data Engineering, 2012.
[9] C.-C. Chen and S.-D. Wang. An E cient Multicharacter Transition String-matching Engine Based on the Aho-corasick Algorithm. ACM Transactions on Architecture and Code Optimization, 2013.
[10] N. Doshi. Using File Contents as Input for Search. Splunk Blogs, 2009.
[11] H. Esmaeilzadeh, E. Blem. R. St.Amant, K. Sankaralingam, and D. Burger. Dark Silicon and the End of Multicore Scaling. In Intl. Symposium on Computer Architecture, 2011.

[12] N. Hua, H. Song, and T. Lakshman. Variable-Stride Multi-Pattern Matching For Scalable Deep Packet Inspection. In INFOCOM 2009, IEEE, 2009.

[13] IBM Corporation. IBM PureData System for Analytics Architecture: A Platform for High Performance Data Warehousing and Analytics. IBM Corporation, 2010.

[14] O. Kocberber, B. Grot, J. Picorel, B. Falsafi, K. Lim, and P. Ranganathan. Meet the Walkers: Accelerating Index Traversals for In-memory Databases. In Proc. 46th Annual International Symp. on Microarchitecture, 2013.

[15] A. Lamb, M. Fuller, R. Varadarajan, N. Tran, B. Vandiver, L. Doshi, and C. Bear. The Vertica Analytic Database: C-store 7 Years Later. Proc. VLDB Endow., 2012.

[16] J. Lunteren, C. Hagleitner. T. Heil, G. Biran, U. Shvadron, and K. Atasu. Designing a Programmable Wire-Speed Regular-Expression Matching Accelerator. In International Symp. on Microarchitecture, 2012.

[17] S. Manegold, M. L. Kersten, and P. Boncz. Database Architecture Evolution: Mammals Flourished Long Before Dinosaurs Became Extinct. Proceedings of the VLDB Endowment, 2009.

[18] M. McCandless, E. Hatcher, and O. Gospodnetic. Lucene in Action. Manning Publications, 2010.

[19] S. Melnik, A. Gubarev, J. J. Long, G. Romer, S. Shivakumar, M. Tolton, and T. Vassilakis. Dremel: Interactive Analysis of Web-Scale Datasets. In PVLDB, 2010.

[20] R. Mu"ller, J. Teubner, and G. Alonso. Data processing on fpgas. PVLDB, 2(1):910-921, 2009.

[21] L. Neumeyer, B. Robbins. A. Nair, and A. Kesari. S4: Distributed Stream Computing Platform. In International Conf. on Data Mining Workshops, 2010.

[22] D. Pao, W. Lin, and B. Liu. A Memory-c ient Pipelined Implementation of the Aho-corasick String-matching Algorithm. ACM Transactions on Architecture and Code Optimization, 2010.

[23] A. Pavlo, E. Paulson, A. Rasin, D. J. Abadi, D. J. DeWitt, S. Madden, and M. Stonebraker. A Comparison of Approaches to Large-scale Data Analysis. In Proc. of the 2009 ACM SIGMOD International Conference on Management of Data, 2009.

[24] A. Raghavan. Y. Luo, A. Chandawalla, M. Papaefthymiou, K. P. Pipe, T. Wenisch, and M. Martin. Computational Sprinting. In 18th International Symposium on High Performance Computer Architecture, 2012.

[25] M. E. Richard L. Villars, Carl W. Olofson. Big Data: What It Is and Why You Should Care. IDC, 2011.

[26] V. Sikka, F. F"arber. A. K. Goel, and W. Lehner. SAP HANA: the evolution from a modern main-memory data platform to an enterprise application platform. PVLDB, 6(11):1184-1185, 2013.

[27] M. Stonebraker, U. C, etintemel, and S. Zdonik. The 8 Requirements of Real-time Stream Processing. ACM SIGMOD Record, 2005.

[28] M. Stonebraker and A. Weisberg. The VoltDB Main Memory DBMS. In Bulletin of the IEEE Computer Society Technical Committee on Data Engineering, 2013.

[29] Synopsys. DesignWare Building Blocks. 2011.

[30] L. Tan and T. Sherwood. A High Throughput String Matching Architecture for Intrusion Detection and Prevention. In Computer Architecture, 2005. ISCA '05. Proceedings. 32nd International Symposium on, 2005.

[31] M. Taylor. Is Dark Silicon Useful? Harnessing the Four Horsemen of the Coming Dark Silicon Apocalypse. In Design Automation Conference, pages 1131-1136, 2012.

[32] J. Teubner, L. Woods, and C. Nie. Skeleton automata for fpgas: reconfiguring without reconstructing. In Proceedings of the ACM SIGMOD International Conference on Management of Data, pages 229-240, 2012.

[33] L. Woods, J. Teubner, and G. Alonso. Complex event detection at wire speed with fpgas. PVLDB, 3(1):660-669, 2010.

[34] L. Wu, A. Lottarini, T. K. Paine, M. A. Kim, and K. A. Ross. Q100: The Architecture and Design of a Database Processing Unit. In Proceedings of the 19th International Conference on Architectural Support for Programming Languages and Operating Systems, ASPLOS '14, 2014.

[35] M. Zaharia, M. Chowdhury, T. Das, A. Dave, J. Ma, M. McCauly, M. J. Franklin, S. Shenker, and I. Stoica. Resilient Distributed Datasets: A Fault-Tolerant Abstraction for In-Memory Cluster Computing. In 9th USENIX Symposium on Networked Systems Design and Implementation (NSDI 12), 2012.

[36] X. Zha and S. Sahni. GPU-to-GPU and Host-to-Host Multipattern String Matching on a GPU. Computers, IEEE Transactions on, 2013.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

Appendix I Text Engine Instructions

A. matchString

| 39:36 | 35:20 | 19:16 | 15:12 | 7:0 |
|---|---|---|---|---|
| 0001 | ID | R1 | R2 | TGT |

Description:
Evaluate incoming input stream character-by-character to determine match against an exact string or a regular expression. String or regular expression is represented in a pattern matching state machine as a set of transition rules of the form <*current state, accepting state?, any character?, not character?, input character, next state, consume character?*>. 'Current state' and 'next state' are self-explanatory. 'Accepting state?' specifies whether the current state is an accepting state. 'Any character?' signifies whether the transition rule matches on any input character, whereas 'not character?' specifies whether the rule should look for any character aside from the one listed as 'input character'. For example, if 'not character?' is set to 1, and character is set to 'z', the transition rule matches on any character that is not 'z'. 'Consume character?' specifies whether the transition rule should consume the next character in the line being processed before moving to the next state, or whether the rule should just peek at the character and move to the next state.
The matchString instruction keeps attempting to match a string until seeing the first character of the delimiter, or until a mismatch is found.

Syntax:
*matchString ID, R1, R2, TGT*
where:
 — ID is the identifier for the relevant pattern matching state machine in memory
 — R1 is a register that contains a pointer to the start of the currently matching string or regular expression
 — R2 is a register that contains a pointer to the end of the string or regular expression that has matched
 — TGT is the PC that the text engine program jumps to upon encountering a failure

Operation:
```
select pattern matching state machine identified by ID
nextState = 0
inputChar = character at the head of the input line do
    if (inputChar == first character of delimiter)
        do not consume character and exit //matches NULL string
    currState = nextState
    if (currState consumes a character)
        advance head pointer //this pointer is local to TE; not the same as pointer into input line buffer
            that is controlled by the aggregator if (currState is accepting state)
            R1 = pointer to start of matching string in input line
            R2 = pointer to end of matching string in input line
            break if (currState indicates failure)
        goto TGT and return fail inputChar = next character in input stream //does not advance head pointer
    nextState = transitionRuleList[currState, inputChar]
while end of line not encountered
```

B. matchNumber

| 39:36 | 35:32 | 31:24 | 23:0 |
|---|---|---|---|
| 0010 | R1 | TGT | Unused |

Description:
Evaluate incoming input stream character-by-character and convert and accumulate the characters into a numerical value. Equivalent to a hardware-based ATOI operation. Incoming characters have to be within the range of valid ASCII values for digits.

Syntax:
*matchNumber R1, TGT*
where:
— R1 is a register where the accumulated number is held
— TGT is the PC that the text engine program jumps to upon encountering a failure, e.g., if incoming character is outside the range of valid ASCII values for digits

Operation:
```
inputChar = character in input line pointed to by the head pointer
do
    if (inputChar is not digit and not start of delimiter)
        do not consume character and exit //matches NULL
    if (inputChar corresponds to a digit)
        R1 = 10*R1 + digit corresponding to ASCII for inputChar if (inputChar is digit, but digit not expected)
        goto TGT and return fail inputChar = next character in input stream
while digits are seen
```

C. checkNumber

| 39:36 | 35:32 | 31:28 | 27:0 |
|---|---|---|---|
| 0011 | R1 | R2 | Unused |

Description:
Compare two registers.

Syntax:
*checkNumber TYPE, R1, R2*
where:
— TYPE represents the type of operation (00: Greater than, 01: Less than, 10: Equal to)
— R1 contains the value to be compared
— R2 contains the value to be compared against

Operation:
```
set operator to '>', '<', '=='
if (R1 operator R2 != true)
    exit and return fail
```

D. math

| 39:36 | 35:32 | 31:28 | 27:24 | 23:0 |
|---|---|---|---|---|
| 0100 | R1 | R2 | R3 | Unused |

Description:
Perform a mathematical operation using two registers as operands.

Syntax:
*math TYPE, R1, R2, R3*
where:
— TYPE represents the type of operation (000: Addition, 001: Subtraction, 010: Multiplication, 011: Division, 100: XOR)
— R1 contains the value for the first operand
— R2 contains the value for the second operand
— R3 denotes the register where the result is written

Operation:
```
set operator to '+', '-', '*', '/', 'XOR'
R3 = R1 operator R2
```

*E. writeToResultQueue*

| 39:36 | 35:32 | 31:28 | 27:24 | ... | 3:0 |
|---|---|---|---|---|---|
| 0101 | NUMREGS | R1 | R2 | ... | R7 |

Description:
Write the specified number of registers out to the result queue. Only called when a line is accepted. Also writes 'success' to status register associated with TE.

Syntax:
*writeToResultQueue NUMREGS, R1, R2, ..., R7*
where:
— NUMREGS represents the number of registers that need to be written out. Up to 7 registers can be specified to be written out
— R1, R2, ..., R7 represent the registers that will be written out to the result queue

Operation:
```
foreach i between 1 and NUMREGS
    write register R[i] to result queue
write 'success' to status register
```

*F. reset*

| 39:36 | 35:27 | 34:0 |
|---|---|---|
| 0111 | EOL | Unused |

Description:
Reset all internal registers and sets status register to running.

Syntax:
*reset EOL*
where:
— EOL specifies the end of line character.

Operation:
```
reset all internal registers
write 'running' to status register
end of line character = EOL
```

*G. ret*

| 39:36 | 35:0 |
|---|---|
| 1000 | Unused |

Description:
Return control to aggregator. Signifies end of the current iteration of the program (one iteration corresponds to one input line being processed).

Syntax:
*ret*
where:
— N/A.

Operation:
```
return to aggregator
```

*H. rejectLine*

| 39:36 | 35:0 |
|---|---|
| 1001 | Unused |

Description:
Reject a line and communicate failure to aggregator by setting the status register to 'failure'. TE asks aggregator for a new line to process.

Syntax:
*rejectLine*
where:
- N/A.

Operation:
```
write 'failure' to status register
```

*I. acceptLine*

| 39:36 | 35:0 |
|---|---|
| 1001 | Unused |

Description:
Accept a line and communicate success to aggregator by setting the status register to 'success'. TE asks aggregator for a new line to process.

Syntax:
*acceptLine*
where:
- N/A.

Operation:
```
write 'success' to status register
```

*J. setReg*

| 39:36 | 35:32 | 31:0 |
|---|---|---|
| 1111 | R1 | VAL |

Description:
Set register to value.

Syntax:
*setReg R1, VAL*
where:
- R1 is the target register
- VAL is the value that the register gets set to

Operation:
```
R1 = VAL
```

Appendix II – Aggregator/Core ISA Extensions

The following are instructions added to the aggregator, which is a simple general purpose core.

A. *popString R1, R2*

Description:
popString pops two entries off the result queue; these entries are known to be pointers. The pointers are assigned to core registers R1 and R2. R1 and R2 can subsequently be manipulated by the core to determine the string in the input line pointed to by the registers.

Syntax:
*popString R1, R2*
where:
— R1 is a core register that the first value popped off the result queue is assigned to.
— R2 is a core register that the second value popped off the result queue is assigned to.

Operation:
```
R1 = resultQueue.pop()
R2 = resultQueue.pop()
```

B. *popNumber R1*

Description:
popNumber pops one entry from the result queue; this entry is known to be a numerical value. The value is assigned to core register R1.

Syntax:
*popNumber R1*
where:
— R1 is a core register that the value popped off the result queue is assigned to.

Operation:
```
R1 = resultQueue.pop()
```

C. *peekBuffer*

Description:
peekBuffer peeks into the front entry of the input line buffer.

Syntax:
*peekBuffer*
where:
   N/A

Operation:
```
read the front of the input line buffer
```

D. *popBuffer*

Description:
popBuffer reads and removes the front entry of the input line buffer.

Syntax:
*popBuffer*
where:
   N/A

Operation:
```
read the front of the input line buffer
signal the input line buffer to pop its front entry
update the pointers for each TE into the input line buffer
```

APPENDIX

An Illustrative Example
The following example illustrates the functionality of our design.
Input Log File

```
1.  job1; user1; 10; pass |
2.  job2; user2; 20; fail |
3.  job3; user2; 30; fail |
4.  job4; user2; 40; pass |
5.  job5; user1; 50; pass |
```

Queries:

*Query 1 (runs on TE1)* – select avg(v2) from "%s;%s;%d;%s" where (v2=="user*" && v3=="pass") groupby v1
*Query 1 (runs on TE2)* – select avg(v2) from "%s;%s;%d;%s" where (v2=="user*" && v3=="fail") groupby v1

Compiled Programs:
*Program 1:*

```
1.   reset |                        //Reset all internal registers, set EOL character to '|'
2.   matchString 1, R1, R2, 11      //Match v0 e.g., 'job1'
3.   matchString 2, R1, R2, 11      //Match ';'
4.   matchString 3, R1, R2, 11      //Match v1 e.g., 'user1'
5.   matchString 2, R3, R4, 11      //Match ';'
6.   matchNumber R3, 11             //Match v2 e.g., '10'
7.   matchString 2, R4, R5, 11      //Match ';'
8.   matchString 4, R4, R5, 11      //Match v3 e.g., 'pass'
9.   writeToResultQueue 3, R1, R2, R3 //Everything matched; write registers out to result queues
10.  acceptLine                     //Line has been accepted at this point; move on
11.  rejectLine                     //Encountered failure; reject line
```

*Program 2:*

```
1.   reset |
2.   matchString 1, R1, R2, 11
3.   matchString 2, R1, R2, 11
4.   matchString 3, R1, R2, 11
5.   matchString 2, R3, R4, 11
6.   matchNumber R3, 11
7.   matchString 2, R4, R5, 11
8.   matchString 4, R4, R5, 11
9.   writeToResultQueue 3, R1, R2, R3
10.  acceptLine
11.  rejectLine
```

Pattern Matching State Machines:
*Pattern Matching State Machines for TE 1:*

| Current State [35:24] | Accepting State? [23:23] | Any Character? [22:22] | Not Character? [21:21] | Character [20:13] | Next State [12:1] | Consume Character? [0:0] |
|---|---|---|---|---|---|---|
| State Machine #1 (ID = 1; matches any string until ';' is seen) ||||||||
| 0 | 0 | 0 | 0 | ';' | 2 | 0 |
| 0 | 0 | 1 | 0 | N/A | 1 | 1 |
| 1 | 0 | 0 | 0 | ';' | 2 | 0 |
| 1 | 0 | 1 | 0 | N/A | 1 | 1 |
| 2 | 1 | 1 | 0 | 0 | 2 | 0 |
| State Machine #2 (ID = 2; matches ';') ||||||||
| 0 | 0 | 0 | 0 | ';' | 1 | 1 |
| 1 | 1 | 1 | 0 | N/A | 1 | 0 |
| State Machine #3 (ID = 3; matches 'user*') ||||||||
| 0 | 0 | 0 | 0 | 'u' | 1 | 1 |
| 1 | 0 | 0 | 0 | 's' | 2 | 1 |
| 2 | 0 | 0 | 0 | 'e' | 3 | 1 |
| 3 | 0 | 0 | 0 | 'r' | 4 | 1 |
| 4 | 0 | 0 | 0 | ';' | 5 | 0 |
| 4 | 0 | 1 | 0 | N/A | 4 | 1 |
| 5 | 1 | 1 | 0 | N/A | 5 | 0 |
| State Machine #4 (ID = 4; matches 'pass') ||||||||
| 0 | 0 | 0 | 0 | 'p' | 1 | 1 |
| 1 | 0 | 0 | 0 | 'a' | 2 | 1 |
| 2 | 0 | 0 | 0 | 's' | 3 | 1 |
| 3 | 0 | 0 | 0 | 's' | 4 | 1 |
| 4 | 1 | 1 | 0 | N/A | 4 | 0 |

TABLE II: State Machine for TE1

*Pattern Matching State Machines for TE 2:*

| Current State [35:24] | Accepting State? [23:23] | Any Character? [22:22] | Not Character? [21:21] | Character [20:13] | Next State [12:1] | Consume Character? [0:0] |
|---|---|---|---|---|---|---|
| State Machine #1 (ID = 1; matches any string until ';' is seen) ||||||||
| 0 | 0 | 0 | 0 | ';' | 2 | 0 |
| 0 | 0 | 1 | 0 | N/A | 1 | 1 |
| 1 | 0 | 0 | 0 | ';' | 2 | 0 |
| 1 | 0 | 1 | 0 | N/A | 1 | 1 |
| 2 | 1 | 1 | 0 | 0 | 2 | 0 |
| State Machine #2 (ID = 2; matches ';') ||||||||
| 0 | 0 | 0 | 0 | ';' | 1 | 1 |
| 1 | 1 | 1 | 0 | N/A | 1 | 0 |
| State Machine #3 (ID = 3; matches 'user*') ||||||||
| 0 | 0 | 0 | 0 | 'u' | 1 | 1 |
| 1 | 0 | 0 | 0 | 's' | 2 | 1 |
| 2 | 0 | 0 | 0 | 'e' | 3 | 1 |
| 3 | 0 | 0 | 0 | 'r' | 4 | 1 |
| 4 | 0 | 0 | 0 | ';' | 5 | 0 |
| 4 | 0 | 1 | 0 | N/A | 4 | 1 |
| 5 | 1 | 1 | 0 | N/A | 5 | 0 |
| State Machine #4 (ID = 4; matches 'fail') ||||||||
| 0 | 0 | 0 | 0 | 'f' | 1 | 1 |
| 1 | 0 | 0 | 0 | 'a' | 2 | 1 |
| 2 | 0 | 0 | 0 | 'i' | 3 | 1 |
| 3 | 0 | 0 | 0 | 'l' | 4 | 1 |
| 4 | 1 | 1 | 0 | N/A | 4 | 0 |

TABLE III: State Machine for TE2

Aggregator Program:

```
1.    create hashmaps HM1 and HM2      //maps are of form <string, <numerator, denominator> > and HM1 and
      HM2 are for TE1 and TE2
2.    foreach hashmap                  //i.e., foreach TE
3.      while (lines remain to be processed)
4.        check all status registers
5.        for all status registers marked 'success'
6.          popString R1, R2           //two front entries of Result Queue
7.          key = string pointed to by R1 and R2
8.          popNumber R3               //next entry in Result Queue
9.          value_numerator = R3
10.         HM[key].numerator = HM[key].numerator + value_numerator
11.         HM[key].denominator = HM[key].denominator + 1
12.         if (TE can process another line, and if pointer into input buffer can be advanced)
13.           push new line to TE
14.           advance pointer into input buffer
15.     foreach key in HM               //at this point all TEs are done with all processing
16.       print avg = HM[key].numerator / HM[key].denominator
```

The two sample queries above are translated into programs that run on each text engine (TE) by the compiler. Each program utilizes a set of pattern matching state machines that are configured for exact string matches or regular expressions. Each TE runs a query above and writes values to the result queue if the line matches the query. For example, TE1 will match on lines 1, 4, and 5, while TE2 matches on lines 2 and 3. The programs above analyze the input stream one character at a time. For the purposes of the explanation, we consider TE1. However, TE2 also operates in a similar manner (the only difference is that TE1 matches on 'pass' for v3 and TE2 matches on 'fail').

The first step in the program for TE1 involves the reset of all internal registers, setting of the character ';' as the end of line character, and setting the status registers to "running". Next, TE1 attempts to match any string on v0 since the query does not specify a string to look for; this corresponds to the matchString instruction on line 2. The matchString instruction keeps attempting to match a string until seeing the first character of the delimiter, or until a match or mismatch is found.

State machine #1 for TE1 looks for "any string". The state machine is composed of a set of transition rules of the form <*current state, accepting state?, any character?, not character?, input character, next state, consume character?*>. 'Current state' and 'next state' are self-explanatory. 'Accepting state?' specifies whether the current state is an accepting state, i.e., a match is found. 'Any character?' signifies whether the transition rule matches on any input character, whereas 'not character?' specifies whether the rule should look for any character aside from that listed as 'input character'. For example, if 'not character?' is set to 1, and character is set to 'z', the transition rule matches on any character that is not 'z'. 'Consume character?' specifies whether the transition rule should consume the next character in the line being processed before moving to the next state, or whether the rule should just peek at the character and move to the next state. Transition rules have priorities encoded in the order in which they appear. Every rule associated with a 'current state' is evaluated sequentially until a matching rule is found, or the rules are exhausted.

In our example, TE1's matchString instruction on line 2 results in success, and then the ';' is seen (';' represents the first, and only, character of the delimiter between v0 and v1). State machine #1 does not consume the ';' character upon seeing it and returns. Control then moves to line 3 in the program which attempts to match the string ';' using state machine #2. Since ';' is the only character in the string, the ';' is consumed and control flows to line 4 of the program. Line 4 attempts to match the string 'user*' using state machine #3 following which ';' is matched using state machine #2. Next, the program for TE1 attempts to convert the incoming characters into a number using the matchNumber instruction on line 6. The instruction converts all characters within the range for valid ASCII values for digits. Subsequently, the program matches the next ';' and the string 'pass'. At this point, TE1 matches line 1 of the input file and writes out the three registers that were set during execution; these writes happen on line 9. Program control is moved to the reset instruction and a new line is processed when assigned by the aggregator.

For line 2 of the input log file, the program for TE1 runs in the same manner as above until line 8 of the program. Line 8 attempts to match the string 'pass'. However, the program sees 'f', the first character of 'fail'. This causes a mismatch on state machine 4 and control moves to line 11 of the program. Subsequently, the program waits for the aggregator to provide the next line to process.

After TE1 and TE2 have analyzed an input line, they write success or failure to the status registers. In case of success, the TE writes register values to the result queue also. The aggregator, which is a simple general purpose core, runs its own program. Since the queries involve a groupby operation on the average runtimes of each job, the aggregator code makes use of a hashmap. The hashmap utilizes the username (user1 or user2) as the key, and maintains a sum of the runtimes associated with each user for both 'pass' and 'fail' strings listed in the queries. At the end of each TE pass, the aggregator tests the status register for which result queue contains values that need to be processed (i.e., for lines that matched) and updates the hashmap.

The aggregator also maintains a pointer into the input line buffer for each TE. The head pointer is updated when a new line is handed off to a TE. When all TEs report that they have processed a certain line, the aggregator post-processes the results from the result queue. After the post-processing step, the front of the input line buffer is popped and a new line for is requested from memory and added to the back of the buffer. In this way, the aggregator allows different TEs to work on different input lines, but maintains a loose barrier that does not allow any TE to get ahead of other TEs by more than a certain number of input lines (i.e., depth of the input buffer).

We claim:

1. A method of processing data comprising the steps of:

receiving a query specifying a query operation to be performed upon input data, wherein said input data is an unindexed sequence of character data;

selecting one or more query algorithms from a plurality of different query algorithms supported by a plurality of hardware execution units, wherein said plurality of different algorithms comprise two or more of:

a per-character pattern matching algorithm using a character matching state machine representing a query operation to be performed with each sequence of one or more characters within a sequence of characters to be queried determining a transition between two states of said character matching state machine and each state within said character matching state machine corresponding a given sequence of received characters; and a per-bit pattern matching algorithm using a plurality of bit matching state machines representing a query operation to be performed with each bit of each character within said sequence of characters to be queried determining a transition between two states of one said plurality of bit matching state machines and each state within said bit matching state machine corresponding a bit within one or more sequences of received characters; and a content addressable memory based algorithm using a content addressable memory storing a plurality of target character sequences to be compared in parallel with one or more characters of a received sequence of characters; and programming one or more hardware execution units to perform said query, wherein said step of programming programs said one or more hardware execution units to use said one or more query algorithms selected from said plurality of different query algorithms to perform different portions of said query operation upon different portions of said input data;

wherein said step of programming selects which of said plurality of different query algorithms to use so as to target one or more of:

a programming storage requirement limit of said one or more hardware execution units;

a processing time limit; and a hardware resources limit of said one or more hardware execution units.

2. A method as claimed in claim 1, wherein said one of more hardware execution units each comprise hardware circuits for performing any one of said plurality of different query algorithms.

3. A method as claimed in claim 1, wherein said step of programming selects which one of said plurality of different query algorithms to use on a per-character basis within a sequence of characters to be queried.

* * * * *